United States Patent
Nie et al.

(10) Patent No.: US 12,524,362 B2
(45) Date of Patent: Jan. 13, 2026

(54) LINK WIDTH ADJUSTMENT METHOD AND APPARATUS

(71) Applicant: HUAWEI TECHNOLOGIES CO., LTD., Guangdong (CN)

(72) Inventors: Er Nie, Shenzhen (CN); Kun Wang, Shenzhen (CN); Pan Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 18/358,217

(22) Filed: Jul. 25, 2023

(65) Prior Publication Data

US 2023/0367728 A1 Nov. 16, 2023

Related U.S. Application Data

(63) Continuation of application No. PCT/CN2022/073245, filed on Jan. 21, 2022.

(30) Foreign Application Priority Data

Jan. 25, 2021 (WO) ............... PCT/CN2021/073651

(51) Int. Cl.
*G06F 13/40* (2006.01)
(52) U.S. Cl.
CPC ...... *G06F 13/4018* (2013.01); *G06F 13/4022* (2013.01)
(58) Field of Classification Search
None
See application file for complete search history.

(56) References Cited

U.S. PATENT DOCUMENTS

| | | |
|---|---|---|
| 7,136,953 B1 | 11/2006 | Bisson et al. |
| 7,426,597 B1 | 9/2008 | Tsu et al. |
| 2004/0090928 A1 | 5/2004 | Drottar et al. |

(Continued)

FOREIGN PATENT DOCUMENTS

| | | |
|---|---|---|
| CN | 1700693 B | 6/2010 |
| CN | 106464427 B | 4/2020 |

(Continued)

OTHER PUBLICATIONS

International Search Report and Written Opinion in International Appln. No. PCT/CN2022/073245, mailed on Apr. 20, 2022, 15 pages (with English translation).

(Continued)

*Primary Examiner* — Henry Tsai
*Assistant Examiner* — Dean Phan
(74) *Attorney, Agent, or Firm* — Fish & Richardson P.C.

(57) ABSTRACT

This application relates to a link width adjustment method and apparatus. The method includes: sending, to a second-end apparatus through a first channel, a first packet indicating to perform link width switching; receiving a second packet that is returned by the second-end apparatus and that indicates that the link width switching is agreed on; sending, to the second-end apparatus through a second channel, a first bit stream to test the second channel for data communication; and sending a data stream to the second-end apparatus through the first channel and the second channel.

18 Claims, 18 Drawing Sheets

(56) References Cited

U.S. PATENT DOCUMENTS

| | | | |
|---|---|---|---|
| 2006/0034295 A1* | 2/2006 | Cherukuri | H04L 65/60 |
| | | | 370/395.52 |
| 2007/0239922 A1 | 10/2007 | Horigan | |
| 2011/0173352 A1 | 7/2011 | Sela et al. | |
| 2013/0077701 A1* | 3/2013 | Tsien | G06F 1/3253 |
| | | | 375/259 |
| 2013/0107716 A1 | 5/2013 | Volpe et al. | |
| 2016/0197743 A1 | 7/2016 | Su et al. | |
| 2017/0063449 A1* | 3/2017 | Dreps | H04B 10/038 |
| 2020/0192853 A1* | 6/2020 | Caruk | G06F 13/1689 |
| 2020/0226084 A1* | 7/2020 | Das Sharma | G06F 13/362 |

FOREIGN PATENT DOCUMENTS

| | | |
|---|---|---|
| WO | 2013095422 A1 | 6/2013 |
| WO | 2016082434 A1 | 6/2016 |

OTHER PUBLICATIONS

International Search Report and Written Opinion in International Appln. No. PCT/CN2021/073651, mailed on Oct. 25, 2021, 14 pages (with English translation).
Extended European Search Report in European Appln. No. 22742257.3, mailed on May 3, 2024, 9 pages.

* cited by examiner

| Identifier | Description |
|---|---|
| 0 | Packet type<br>0xA0: Link power consumption management packet<br>Others: Reserved |
| 1 | Link management type<br>0x1: Link width management packet<br>Others: Reserved |
| 2 | Link width adjustment request<br>Zeroth bit: Request for adjusting a link width in a sending direction<br>First bit: Request for adjusting a link width in a receiving direction<br>Second bit: Request for disabling all channels<br>Third bit: Reserved<br>Fourth bit to seventh bit: Identifier of the link width request, and fixedly 0xA1 |
| 3 | Response to the link width adjustment request<br>Zeroth bit: Response to the request for adjusting the link width in the sending direction<br>A value 0 indicates a rejection, and a value 1 indicates an agreement.<br>First bit: Request for adjusting a link width in a receiving direction<br>A value 0 indicates a rejection, and a value 1 indicates an agreement.<br>Second bit: A channel in the receiving direction is successfully enabled<br>Third bit: Reserved<br>Fourth bit to seventh bit: Identifier of the response to the link width request, and fixedly 0xA2 |
| 4 | Link width in the sending direction<br>Value 000001 of the zeroth bit to the fifth bit indicates: X1<br>Value 000010 of the zeroth bit to the fifth bit indicates: X2<br>Value 000100 of the zeroth bit to the fifth bit indicates: X4<br>Value 001000 of the zeroth bit to the fifth bit indicates: X8<br>Value 010000 of the zeroth bit to the fifth bit indicates: X16<br>Value 100000 of the zeroth bit to the fifth bit indicates: X32<br>Another value of the zeroth bit to the fifth bit: Reserved<br>Sixth bit and seventh bit: Reserved |
| 5 | Link width in the receiving direction<br>Value 000001 of the zeroth bit to the fifth bit indicates: X1<br>Value 000010 of the zeroth bit to the fifth bit indicates: X2<br>Value 000100 of the zeroth bit to the fifth bit indicates: X4<br>Value 001000 of the zeroth bit to the fifth bit indicates: X8<br>Value 010000 of the zeroth bit to the fifth bit indicates: X16<br>Value 100000 of the zeroth bit to the fifth bit indicates: X32<br>Another value of the zeroth bit to the fifth bit: Reserved<br>Sixth bit and seventh bit: Reserved |
| 6 to 13 | Reserved |
| 14 | Parity bit |
| 15 | Parity bit |

FIG. 4b

| Identifier | Description |
| --- | --- |
| 0 | Training type<br>0xC0: Training activation<br>0xC1: Training determining<br>0xX2: Link negotiation is started at a physical layer<br>Others: Reserved |
| 1 to 11 | Reserved |
| 12 | Parity bit |
| 13 | Parity bit |
| 14 | Balance value |
| 15 | Balance value |

FIG. 4c

| Identifier | Description |
|---|---|
| 0 and 1 | UM 0 |
| 2 and 3 | UM 1 |
| 4 | Reserved |
| 5 and 6 | UM 0 |
| 7 and 8 | UM 1 |
| 9 | Reserved |
| 10 and 11 | UM 0 |
| 12 and 13 | UM 1 |
| 14 | Reserved |
| 15 and 16 | UM 0 |
| 17 and 18 | UM 1 |
| 19 | Reserved |

FIG. 4d

| AM_ID 0 | AM_ID 1 | AM_ID 2 | ... | AM_ID N | AM_ END | AM_Payload_ Type | AM_Payload_ Detail |
|---|---|---|---|---|---|---|---|

FIG. 4f

| | |
|---|---|
| Type | Zeroth bit: Request for adjusting a link width in a sending direction<br>First bit: Request for adjusting a link width in a receiving direction<br>Second bit: Response to the request for adjusting the link width in the sending direction<br>Third bit: Response to the request for adjusting the link width in the receiving direction<br>Fourth bit: Response to a success of increasing the link width in the receiving direction<br>Fifth bit: Request for starting link width adjustment in the sending direction<br>Sixth bit and seventh bit: Reserved |
| Specific information | Case 1: A value of the zeroth bit of the type, a value of the first bit of the type, or a value of the fifth bit of the type is 1<br>The zeroth bit to the fifth bit indicate the link width in the sending direction<br>Value 000001 of the zeroth bit to the fifth bit indicates: X1<br>Value 000010 of the zeroth bit to the fifth bit indicates: X2<br>Value 000100 of the zeroth bit to the fifth bit indicates: X4<br>Value 001000 of the zeroth bit to the fifth bit indicates: X8<br>Value 010000 of the zeroth bit to the fifth bit indicates: X16<br>Value 100000 of the zeroth bit to the fifth bit indicates: X32<br>Another value of the zeroth bit to the fifth bit: Reserved<br>Sixth bit and seventh bit: Reserved<br>The eighth bit to the fifteenth bit indicate the link width in the receiving direction<br>Value 000001 of the eighth bit to the fifteenth bit indicates: X1<br>Value 000010 of the eighth bit to the fifteenth bit indicates: X2<br>Value 000100 of the eighth bit to the fifteenth bit indicates: X4<br>Value 001000 of the eighth bit to the fifteenth bit indicates: X8<br>Value 010000 of the eighth bit to the fifteenth bit indicates: X16<br>Value 100000 of the eighth bit to the fifteenth bit indicates: X32<br>Another value of the eighth bit to the fifteenth bit: Reserved<br><br>Case 2: A value of the second bit of the type or a value of the third bit of the type is 1<br>Zeroth bit: Response to the request for adjusting the link width in the sending direction<br>A value 0 indicates a rejection, and a value 1 indicates an agreement.<br>First bit: Request for adjusting a link width in a receiving direction<br>A value 0 indicates a rejection, and a value 1 indicates an agreement.<br>Second bit to fifteenth bit: Reserved |

FIG. 4g

LINK WIDTH ADJUSTMENT METHOD AND APPARATUS

CROSS-REFERENCE TO RELATED APPLICATIONS

This application is a continuation of International Application No. PCT/CN2022/073245, filed on Jan. 21, 2022, which claims priority to International Patent Application No. PCT/CN2021/073651, filed on Jan. 25, 2021. The disclosures of the aforementioned applications are hereby incorporated by reference in their entireties.

TECHNICAL FIELD

This application relates to the field of link management, and in particular, to a link width adjustment method and apparatus.

BACKGROUND

Each port of a high-speed serial interface can support a plurality of link widths and a plurality of transmission speeds. A bandwidth that a port can provide varies with a link width or a transmission speed of the port. Power consumption of circuits such as a controller of a high-speed serial structure, a retimer (Retimer), and a serializer-deserializer (Serializer-Deserializer, SerDes) is closely related to a link width and a transmission speed. A traffic volume (which may also be referred to as load) of a data stream in a serial link is dynamically changing. If a link width is not adaptively adjusted based on the traffic volume, a problem of power consumption is caused when traffic decreases; or a problem of an insufficient bandwidth is caused when traffic increases.

SUMMARY

In view of this, a link width adjustment method and apparatus are provided, so that a link width can be adjusted when data stream transmission is ensured.

According to a first aspect, an embodiment of this application provides a link width adjustment method. The method is applied to a first-end apparatus, and the method includes: sending a first packet to a second-end apparatus through a first channel, where the first packet carries first indication information indicating to perform link width switching; receiving a second packet returned by the second-end apparatus, where the second packet carries second indication information indicating that the link width switching is agreed on; sending a first bit stream to the second-end apparatus through a second channel, where the first bit stream is used to train the second channel for data communication; and sending a data stream to the second-end apparatus through the first channel and the second channel.

In this embodiment of this application, the first bit stream used for channel training is sent on the newly enabled second channel, to send the data stream through the second channel, so as to increase a link width. In a related technology, when a link width is increased, a training mode needs to be switched to, and consequently, data stream transmission is interrupted. However, in this embodiment of this application, because the first channel can be normally used to send the data stream in an entire channel link width switching process, a training mode does not need to be switched to, and a training bit stream is sent based only on the newly enabled second channel, to increase the link width for sending the data stream. Therefore, normal data stream transmission in the entire channel link width switching process is ensured, a problem of data stream interruption caused by channel link width switching is resolved, and reliability is improved.

In a possible implementation, before the sending a data stream to the second-end apparatus through the first channel and the second channel, the method further includes: sending a second bit stream to the second-end apparatus through the first channel and the second channel, where the second bit stream indicates a link width for sending the data stream.

In this embodiment of this application, the second bit stream may be sent between data streams. In this way, after the first-end apparatus notifies, by using the second bit stream, the second-end apparatus that the first-end apparatus subsequently uses a new link width to send the data stream, link width alignment can be implemented between the first-end apparatus and the second-end apparatus, so that the second-end apparatus can use the new link width to unpack a data stream received after the second bit stream, to ensure correct unpacking of the data stream, and improve reliability. For example, the second bit stream may be a bit stream whose data structure conforms to an AM format.

In a possible implementation, the data stream includes a second bit stream, and the second bit stream indicates a link width for sending the data stream.

In this embodiment of this application, the second bit stream may be carried in the data stream. In this way, when receiving the data stream, the second-end apparatus may obtain the second bit stream from the data stream, to learn that a new link width needs to be used to unpack the data stream. This implements link width alignment between the first-end apparatus and the second-end apparatus, ensures correct unpacking of the data stream by the second-end apparatus, and improves reliability.

In a possible implementation, after the sending a first bit stream to the second-end apparatus through a second channel, the method further includes: receiving a third packet sent by the second-end apparatus, where the third packet carries third indication information indicating that data communication can be performed on the second channel.

In this embodiment of this application, after the third packet sent by the second-end apparatus is received, it is determined that data communication can be performed on the second channel, and then the data stream is sent through the second channel. This can avoid a data stream loss caused because data communication cannot be performed on the newly enabled second channel, and improve reliability.

In a possible implementation, the first-end apparatus includes a first data link layer DL, and the second-end apparatus includes a second DL; and the sending a first packet to a second-end apparatus through a first channel includes: sending a first data link flit DLF to the second DL through the first DL and the first channel, where the first DLF carries the first indication information, the first indication information includes a first identifier and a first link width, the first identifier indicates that the first DLF is a request packet for adjusting a link width in a sending direction, and the first link width indicates a target link width.

In a possible implementation, the receiving a second packet returned by the second-end apparatus includes: receiving, through the first DL, a second DLF sent through the second DL, where the second DLF includes the second indication information, the second indication information includes a second identifier and the first link width, and the second identifier indicates that the second DLF is a response indicating an agreement on the request for adjusting the link width in the sending direction.

In a possible implementation, the first-end apparatus further includes a first media access control MAC layer, and after the receiving a second DLF through the first DL, the method further includes: sending a first indication to the first MAC layer through the first DL, to cause the first MAC layer to enable the second channel.

In this embodiment of this application, a new channel can be enabled through the MAC layer to increase the link width.

In a possible implementation, the second-end apparatus further includes a second MAC layer, and the sending a first bit stream to the second-end apparatus through a second channel includes: sending the first bit stream to the second MAC layer through the first MAC layer and the second channel.

In this embodiment of this application, link width alignment can be implemented through negotiation between the MAC layers.

In a possible implementation, the first-end apparatus includes a first DL, and the second-end apparatus includes a second DL; and the receiving a third packet sent by the second-end apparatus includes: receiving, through the first DL, a third DLF sent through the second DL, where the third DLF includes the third indication information, the third indication information includes a third identifier, and the third identifier indicates that data communication can be performed on the second channel.

In a possible implementation, the first-end apparatus further includes a first MAC layer, and the second-end apparatus further includes a second MAC layer; and the sending a data stream to the second-end apparatus through the first channel and the second channel includes: sending a second indication to the first MAC layer through the first DL, to cause the first MAC to send the data stream to the second MAC layer through the first channel and the second channel.

According to any one of the first aspect or the foregoing possible implementations of the first aspect, in a tenth possible implementation of the method, the first packet carries the first link width, and the first link width indicates the target link width.

In this embodiment of this application, the first link width is carried in the first packet, so that the second-end apparatus can determine whether the first link width can meet a communication requirement of the second-end apparatus in a receiving direction, for example, whether data traffic received by the second-end apparatus matches the first link width, or whether data traffic received by the second-end apparatus after a period of time matches the first link width, to determine whether to agree on the link width switching, and further complete link width switching negotiation.

According to a second aspect, an embodiment of this application provides a link width adjustment method. The method is applied to a first-end apparatus, and the method includes: sending a first packet to a second-end apparatus through a first channel, where a data structure of the first packet conforms to an alignment marker AM format, and the first packet carries first indication information indicating to perform link switching; receiving a second packet returned by the second-end apparatus, where a data structure of the second packet conforms to the AM packet, and the second packet carries second indication information indicating that the link width switching is agreed on; and sending a data stream to the second-end apparatus through a third channel, where the third channel corresponds to a first link width.

In this embodiment of this application, link width negotiation is implemented by using a packet in the AM format, so that normal data stream transmission in an entire channel link width switching process can be ensured, a problem of data stream interruption caused by channel link width switching is resolved, and reliability is improved.

In a possible implementation, the first channel corresponds to a second link width, and the first link width is greater than the second link width; and before the sending a data stream to the second-end apparatus through a third channel, the method further includes:
  sending a first bit stream to the second-end apparatus through a second channel, where the first bit stream is used to train the second channel for data communication; and
  the sending a data stream to the second-end apparatus through a third channel includes:
  sending the data stream to the second-end apparatus through the first channel and the second channel.

In a possible implementation, before the sending a data stream to the second-end apparatus through the first channel and the second channel, the method further includes:
  sending a second bit stream to the second-end apparatus through the first channel and the second channel, where the second bit stream indicates the first link width.

In a possible implementation, after the sending a first bit stream to the second-end apparatus through a second channel, the method further includes:
  receiving a third packet sent by the second-end apparatus, where a data structure of the third packet conforms to the AM format, and the third packet carries third indication information indicating that data communication can be performed on the second channel.

In a possible implementation, the data stream includes a second bit stream, and the second bit stream indicates the first link width.

In a possible implementation, the first channel corresponds to a second link width, and the first link width is less than the second link width; and before the sending a data stream to the second-end apparatus through a third channel, the method further includes:
  determining the third channel from the first channel.

In a possible implementation, before the sending a data stream to the second-end apparatus through a third channel, the method further includes:
  sending a second bit stream to the second-end apparatus through the third channel, wherein the second bit stream indicates the first link width.

In a possible implementation, the data stream includes a second bit stream, and the second bit stream indicates the first link width.

According to any one of the second aspect or the possible implementations of the second aspect, in an eighth possible implementation of the method, the first packet carries the first link width.

According to a third aspect, an embodiment of this application provides a link width adjustment apparatus. The apparatus is used for a first-end apparatus, and the apparatus includes:
  a first sending module, configured to send a first packet to a second-end apparatus through a first channel, where the first packet carries first indication information indicating to perform link width switching;
  a first receiving module, configured to receive a second packet returned by the second-end apparatus, where the second packet carries second indication information indicating that the link width switching is agreed on;

a second sending module, configured to send a first bit stream to the second-end apparatus through a second channel, where the first bit stream is used to train the second channel for data communication; and a third sending module, configured to send a data stream to the second-end apparatus through the first channel and the second channel.

In a possible implementation, the apparatus further includes:

a fourth sending module, configured to send a second bit stream to the second-end apparatus through the first channel and the second channel, where the second bit stream indicates a link width for sending the data stream.

In a possible implementation, the data stream includes a second bit stream, and the second bit stream indicates a link width for sending the data stream.

In a possible implementation, the apparatus further includes:

a second receiving module, configured to receive a third packet sent by the second-end apparatus, where the third packet carries third indication information indicating that data communication can be performed on the second channel.

In a possible implementation, the first-end apparatus includes a first data link layer DL, and the second-end apparatus includes a second DL; and the first sending module is further configured to:

send a first data link flit DLF to the second DL through the first DL and the first channel, where the first DLF carries the first indication information, the first indication information includes a first identifier and a first link width, the first identifier indicates that the first DLF is a request packet for adjusting a link width in a sending direction, and the first link width indicates a target link width.

In a possible implementation, the first receiving module is further configured to:

receive, through the first DL, a second DLF sent through the second DL, where the second DLF includes the second indication information, the second indication information includes a second identifier and the first link width, and the second identifier indicates that the second DLF is a response indicating an agreement on the request for adjusting the link width in the sending direction.

In a possible implementation, the first-end apparatus further includes a first media access control MAC layer, and the apparatus further includes:

a fifth sending module, configured to send a first indication to the first MAC layer through the first DL, to cause the first MAC layer to enable the second channel.

In a possible implementation, the second-end apparatus further includes a second MAC layer, and the second sending module is further configured to:

send the first bit stream to the second MAC layer through the first MAC layer and the second channel.

In a possible implementation, the first-end apparatus includes a first DL, and the second-end apparatus includes a second DL; and the second receiving module is further configured to:

receive, through the first DL, a third DLF sent through the second DL, where the third DLF includes the third indication information, the third indication information includes a third identifier, and the third identifier indicates that data communication can be performed on the second channel.

In a possible implementation, the first-end apparatus further includes a first MAC layer, and the second-end apparatus further includes a second MAC layer; and the third sending module is further configured to:

send a second indication to the first MAC layer through the first DL, to cause the first MAC to send the data stream to the second MAC layer through the first channel and the second channel.

In a possible implementation, the first packet carries the first link width, and the first link width indicates the target link width.

According to a fourth aspect, an embodiment of this application provides a link width adjustment apparatus. The apparatus is used for a first-end apparatus, and the apparatus includes:

a first sending module, configured to send a first packet to a second-end apparatus through a first channel, where a data structure of the first packet conforms to an AM format, and the first packet carries first indication information indicating to perform link switching;

a first receiving module, configured to receive a second packet returned by the second-end apparatus, where a data structure of the second packet conforms to the AM format, and the second packet carries second indication information indicating that the link width switching is agreed on; and a second sending module, configured to send a data stream to the second-end apparatus through a third channel, where the third channel corresponds to a first link width.

In a possible implementation, the first channel corresponds to a second link width, and the first link width is greater than the second link width; and the apparatus further includes:

a third sending module, configured to send a first bit stream to the second-end apparatus through a second channel, where the first bit stream is used to train the second channel for data communication; and the second sending module is further configured to:

send the data stream to the second-end apparatus through the first channel and the second channel.

In a possible implementation, the apparatus further includes:

a fourth sending module, configured to send a second bit stream to the second-end apparatus through the first channel and the second channel, where the second bit stream indicates the first link width.

In a possible implementation, the apparatus further includes:

a second receiving module, configured to receive a third packet sent by the second-end apparatus, where a data structure of the third packet conforms to the AM format, and the third packet carries third indication information indicating that data communication can be performed on the second channel.

In a possible implementation, the data stream includes a second bit stream, and the second bit stream indicates the first link width.

In a possible implementation, the first channel corresponds to a second link width, and the first link width is less than the second link width; and the apparatus further includes:

a determining module, configured to determine the third channel from the first channel.

In a possible implementation, the apparatus further includes:

a fifth sending module, configured to send a second bit stream to the second-end apparatus through the third channel, where the second bit stream indicates the first link width.

In a possible implementation, the data stream includes a second bit stream, and the second bit stream indicates the first link width.

In a possible implementation, the first packet carries the first link width.

According to a fifth aspect, an embodiment of this application provides a serial port. The electronic device may perform the link width adjustment method according to one or more of the first aspect or the plurality of possible implementations of the first aspect, or the link width adjustment method according to one or more of the second aspect or the plurality of possible implementations of the second aspect.

According to a sixth aspect, an embodiment of this application provides a computer program product, including computer-readable code or a non-volatile computer-readable storage medium carrying computer-readable code. When the computer-readable code is run in an electronic device, a processor in the electronic device performs the link width adjustment method according to one or more of the first aspect or the plurality of possible implementations of the first aspect, or the link width adjustment method according to one or more of the second aspect or the plurality of possible implementations of the second aspect.

According to a seventh aspect, an embodiment of this application provides a computer program product, including computer-readable code or a non-volatile computer-readable storage medium carrying computer-readable code. When the computer-readable code is run in an electronic device, a processor in the electronic device performs the link width adjustment method according to one or more of the first aspect or the plurality of possible implementations of the first aspect, or the link width adjustment method according to one or more of the second aspect or the plurality of possible implementations of the second aspect.

These aspects and other aspects of this application are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this application, and are intended to explain principles of this application.

FIG. 4b shows an example data structure of a DLF;

FIG. 4c shows an example data structure of an RTSB;

FIG. 4d shows an example data structure of an AM;

FIG. 4f shows an example data structure of a packet conforming to an AM format;

FIG. 4g is a schematic diagram of an example of an AM type and carried specific information;

DESCRIPTION OF EMBODIMENTS

Figure 1A:
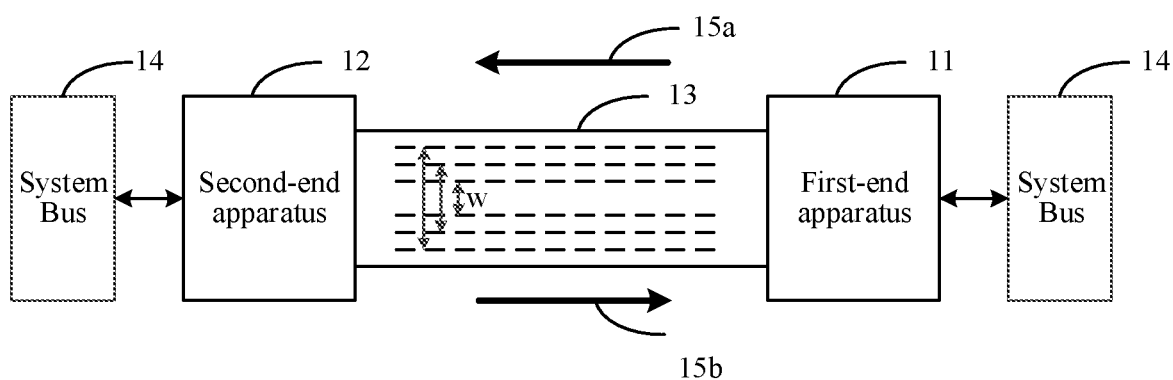
FIG. 1a is a schematic architectural diagram of an end-to-end connection system.

The following describes various example embodiments, features, and aspects of this application in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as an "example" is not necessarily explained as being superior or better than other embodiments.

In addition, to better describe this application, numerous specific details are given in the following specific implementations. A person skilled in the art should understand that this application can also be implemented without some specific details. In some embodiments, methods, means, elements, and circuits that are well-known to a person skilled in the art are not described in detail, so that the subject matter of this application is highlighted.

FIG. 1a is a schematic architectural diagram of an end-to-end connection system. As shown in FIG. 1a, the connection system includes a first-end apparatus 11 and a second-end apparatus 12. The first-end apparatus 11 and the second-end apparatus 12 are connected through a link 13. In an example, ports of the first-end apparatus 11 and the second-end apparatus 12 include but are not limited to peripheral component interface express (Peripheral Component Interface Express, PCIe) ports, and the first-end apparatus 11 and the second-end apparatus 12 may further include other serial ports, for example, a port of an industry standard architecture (Industry Standard Architecture, ISA) bus interface. This is not limited in embodiments of this application.

The link 13 may include a plurality of channels (lanes), where each channel may be used to transfer a data stream in a given period. A width of the link 13 indicates a quantity of channels enabled during communication. XN may indicate the width of the link 13, where N is the quantity of channels enabled during communication. For example, X16, X8, X4, or X2 may indicate that the quantity of channels enabled during communication is 16, 8, 4, or 2, respectively. The width of the link 13 may be used to effectively control a bandwidth w of the link 13, and a link with a larger link width provides a larger bandwidth w than a link with a smaller link width. Considering that each channel needs to be supported by a corresponding circuit, a link with a larger link width causes higher power consumption than a link with a smaller link width. In addition, a transmission speed of the link 13 may also be effectively used to control the bandwidth w of the link 13, and a link with a higher transmission speed provides a larger bandwidth w than a link with a lower transmission speed.

There are two service directions between the first-end apparatus 11 and the second-end apparatus 12, that is, a service direction 15a for transmitting a data stream from the first-end apparatus 11 to the second-end apparatus 12 and a service direction 15b for transmitting a data stream from the second-end apparatus 12 to the first-end apparatus 11. Specifically, for the first-end apparatus 11, the service direction 15a is a sending (outbound) direction, and the service direction 15b is a receiving (inbound) direction. For the second-end apparatus 12, the service direction 15b is a sending direction, and the service direction 15a is a receiving direction. TXN (Transmitter XN) may indicate a link width of the link 13 in the sending direction, that is, a quantity of channels enabled in the sending direction during communication. RXN (Receiver XN) may indicate a link width of the link 13 in the receiving direction, that is, a quantity of channels enabled in the sending direction during communication. In an example, TX2RX4 may indicate that the link width of the link 13 in the sending direction is 2 and the link width of the link 13 in the receiving direction is 4.

In an example, the link 13 may be a bidirectional link. To be specific, the link 13 may be used to transmit a data stream from the first-end apparatus 11 to the second-end apparatus 12, and may also be used to transmit a data stream from the second-end apparatus 12 to the first-end apparatus 11. The bidirectional link may be a full duplex link, and data streams can flow concurrently in two directions of a single channel. Alternatively, the bidirectional link may be a half duplex link, and data streams flow in only one direction of a channel at any given moment. In this case, communication between the first-end apparatus 11 and the second-end apparatus 12 in the two service directions can be implemented through only one link 13.

In another example, the link 13 may be a unidirectional link. To be specific, the link 13 may be only used to transmit a data stream from the first-end apparatus 11 to the second-end apparatus 12, or may be only used to transmit a data stream from the second-end apparatus 12 to the first-end apparatus 11. When the link 13 is a unidirectional link, two links 13 may be used to separately implement communication between the first-end apparatus 11 and the second-end apparatus 12 in the two service directions.

During implementation, the first-end apparatus 11 and the second-end apparatus 12 may be connected to a system bus 14 of an electronic device. The electronic device may be a smartphone, a netbook, a tablet computer, a notebook computer, a wearable electronic device (for example, a smart band or a smartwatch), a TV, a virtual reality device, a server, or the like, and the electronic device is not limited in embodiments of this application.

Figure 1B:
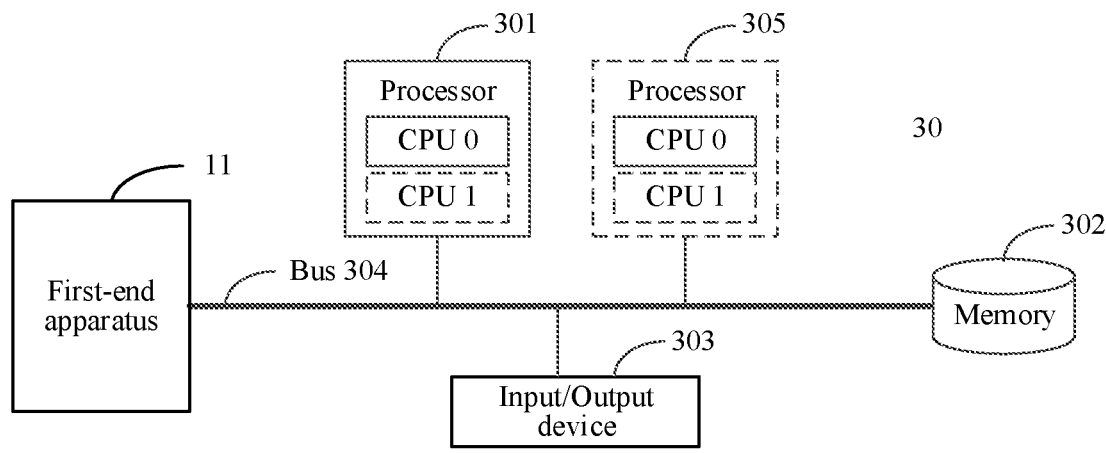
FIG. 1b is a schematic structural diagram of an electronic device.

FIG. 1b is a schematic structural diagram of an electronic device. As shown in FIG. 1b, the electronic device 30 may include at least one processor 301, a memory 302, an input/output device 303, and a bus 304. The following describes the components of the electronic device in detail with reference to FIG. 1b.

The processor 301 is a control center of the electronic device, and may be a processor, or may be a collective term of a plurality of processing elements. For example, the processor 301 is a CPU or may be an application-specific integrated circuit (Application-Specific Integrated Circuit, ASIC), or one or more integrated circuits configured to implement embodiments of this application, such as one or more microprocessors (Digital Signal Processors, DSPs) or one or more field programmable gate arrays (Field Programmable Gate Arrays, FPGAs).

The processor 301 may perform various functions of the electronic device by running or executing a software program stored in the memory 302 and invoking data stored in the memory 302.

During specific implementation, in an embodiment, the processor 301 may include one or more CPUs, for example, a CPU 0 and a CPU 1 shown in the figure.

During specific implementation, in an embodiment, the electronic device may include a plurality of processors, for example, the processor 301 and a processor 305 shown in FIG. 1b. Each of the processors may be a single-core (single-CPU) processor, or may be a multi-core (multi-CPU) processor. The processor herein may be one or more devices, circuits, and/or processing cores configured to process data (for example, computer program instructions).

The memory 302 may be a read-only memory (Read-Only Memory, ROM) or another type of static storage device that can store static information and instructions, or a random access memory (Random Access Memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of an instruction or a data structure and that can be accessed by a computer. However, the memory is not limited thereto.

The input/output device 303 is configured to communicate with another device or a communication network, for example, configured to communicate with a communication network such as the Ethernet, a radio access network (Radio access network, RAN), or a wireless local area network (Wireless Local Area Network, WLAN). The input/output device 303 may include all or a part of a baseband processor, and may selectively include a radio frequency (Radio Frequency, RF) processor. The RF processor is configured to send or receive an RF signal. The baseband processor is configured to process a baseband signal converted from an RF signal, or a baseband signal to be converted into an RF signal.

During specific implementation, in an embodiment, the input/output device 303 may include a transmitter and a receiver. The transmitter is configured to send a signal to another device or a communication network, and the receiver is configured to receive a signal sent by the another device or the communication network. The transmitter and the receiver may exist independently or may be integrated together.

The bus 304 may be an industry standard architecture (Industry Standard Architecture, ISA) bus, a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, and the like. For ease of representation, only one bold line is used for representation in FIG. 1b, but this does not mean that there is only one bus or only one type of bus.

As shown in FIG. 1b, the electronic device 30 may further include the first-end apparatus 11 shown in FIG. 1a, and the first-end apparatus 11 may be connected to the bus 304 shown in FIG. 1b, Certainly, the electronic device 30 may further include the second-end apparatus 12 shown in FIG. 1a, and the second-end apparatus 12 may also be connected to the bus 304 (not shown) shown in FIG. 1b.

A device structure shown in FIG. 1b does not constitute a limitation on the electronic device. The electronic device may include components more or fewer than those shown in the figure, or some components may be combined, or different component arrangements may be used.

During actual application, a traffic volume (which may also be referred to as load) of a data stream in a serial link such as the link 13 shown in FIG. 1a is dynamically changing. If a link width is not adaptively adjusted based on the traffic volume, a problem of power consumption is caused when traffic decreases; or a problem of an insufficient bandwidth is caused when traffic increases. Further, traffic volumes of the data stream on the serial link in the two service directions may be different. Therefore, bandwidths required by the serial link in the two service directions may also be different. In a related technology, if a bandwidth requirement in a service direction becomes higher, a width of an entire link needs to be increased, causing power consumption. However, if the width of the entire link is not increased, a problem of an insufficient bandwidth in the service direction is caused.

In embodiments of this application, data traffic in a first service direction may be measured, and when link width switching is performed in the first service direction based on the data traffic, a link width in a second service direction is kept unchanged. Link widths in the two service directions are independently adjusted by independently monitoring traffic volumes in the two service directions, to resolve problems of power consumption and an insufficient bandwidth.

Figure 2A:
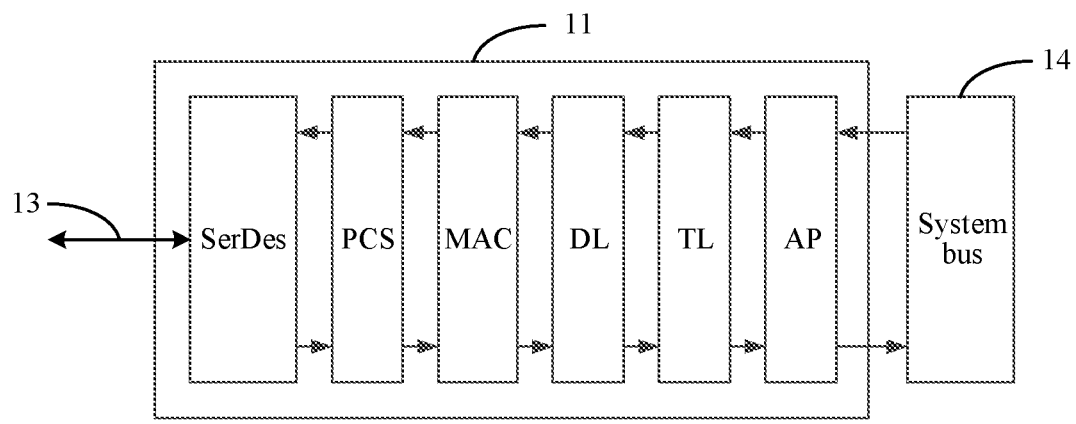
FIG. 2a provides a basic hierarchical schematic diagram of a serial port.

The serial port supports hierarchical communication protocols. FIG. 2a provides a basic hierarchical schematic diagram of a serial port. Specifically, FIG. 2a is a basic hierarchical schematic diagram of the first-end apparatus 11 shown in FIG. 1a. As shown in FIG. 2a, the first-end apparatus 11 includes a serializer/deserializer (Serializer-Deserializer, SerDes), a physical coding sublayer (Physical coding sublayer, PCS), a media access control (Media Access Control, MAC) layer, a data link (Data Link, DL) layer, a transaction layer (Transaction Layer, TL), and an application (AP) layer from bottom to top. The SerDes and the PCS may be collectively referred to as a physical layer (Physical Layer, PHY). Each layer may be implemented by using hardware logic. For layering of the second-end apparatus 12 shown in FIG. 1a, refer to FIG. 2a. Details are not described herein again.

During implementation, a data stream is generated in the AP of the first-end apparatus 11, then passes through the TL, the DL, the MAC layer, the PCS, and the SerDes of the first-end apparatus, and finally is sent. The data stream may finally arrive at an AP of the second-end apparatus through a SerDes, a PCS, a MAC layer, a DL, and a TL of the second-end apparatus 12, to implement transmission of the data stream from the first-end apparatus 11 to the second-end apparatus 12. For a process of transmitting the data stream from the second-end apparatus 12 to the first-end apparatus 11, refer to a process of transmitting the data stream from the first-end apparatus 11 to the second-end apparatus 12. Details are not described herein again.

The SerDes of the first-end apparatus 11 includes a receiver (Receiver, RX) and a transmitter (Transmitter, TX). The SerDes of the second-end apparatus 12 may also include an RX and a TX. A service direction of a channel between the TX of the first-end apparatus 11 and the RX of the second-end apparatus is shown as 15a in FIG. 1a, and a service direction of a channel between the RX of the first-end apparatus 11 and the TX of the second-end apparatus is shown as 15b in FIG. 1a.

Figure 2B:
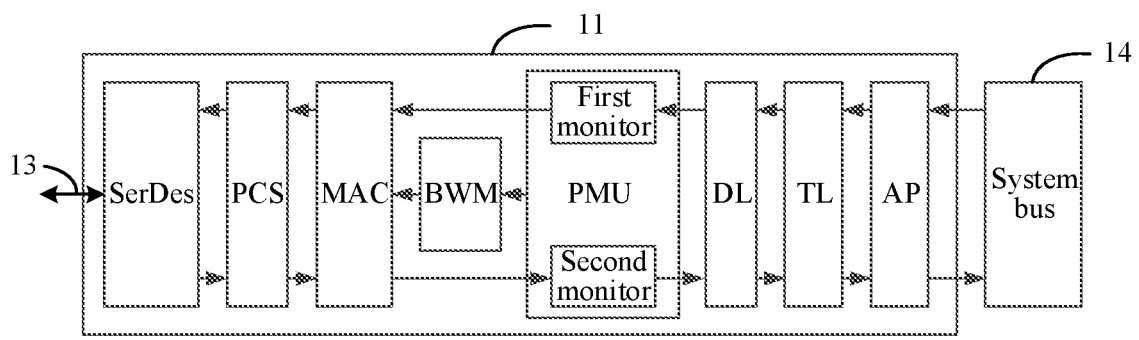
FIG. 2b provides a hierarchical schematic diagram of a serial port according to an embodiment of this application.

FIG. 2b provides a hierarchical schematic diagram of a serial port according to an embodiment of this application. Specifically, FIG. 2b is a hierarchical schematic diagram of the first-end apparatus 11 shown in FIG. 1a in embodiments of this application. As shown in FIG. 2b, based on the basic hierarchical schematic diagram shown in FIG. 2a, in this embodiment of this application, a performance monitor unit (Performance Monitor Unit, PMU) is added between the MAC layer and the DL, and a bandwidth management module (Bandwidth manager, BWM) is added between the MAC layer and the PMU.

The PMU may measure data traffic in two service directions. In an example, the PMU may include a first monitor and a second monitor. The first monitor is configured to measure data traffic in a sending direction, and the second monitor may be configured to measure data traffic in a receiving direction. During implementation, the service direction measured by the PUM may be configured as required, and the PUM may measure data traffic in only one service direction, or may measure data traffic in the two service directions at the same time.

The BWM may obtain data traffic in one or two service directions measured by the PMU. The BMW may determine, based on the data traffic in the sending direction measured by the PMU, whether a link bandwidth in the sending direction needs to be adjusted, and/or determine, based on the data traffic in the receiving direction measured by the PMU, whether a link bandwidth in the receiving direction needs to be adjusted.

It should be noted that, in embodiments of this application, the BMW can obtain measurement results from the PMU, and the PMU and the BWM may be disposed between any two layers shown in FIG. 2a, or disposed in any layer other than the SerDes shown in FIG. 2a. Locations at which the PMU and the BWM are disposed are not limited in embodiments of this application.

For a hierarchical schematic diagram of the second-end apparatus 12, refer to the hierarchical schematic diagram of the first-end apparatus 11. Details are not described herein again. In embodiments of this application, a first MAC layer indicates the MAC layer included in the first-end apparatus 11, and a first DL indicates the DL included in the first-end apparatus 11. A second MAC layer indicates the MAC included in the second-end apparatus 12, and a second DL indicates the DL included in the second-end apparatus 12.

In embodiments of this application, the PMU and the BWM are combined to implement independent monitoring and link width adjustment in the two service directions. The following describes in detail the foregoing monitoring and adjustment process with reference to FIG. 3.

Figure 3:
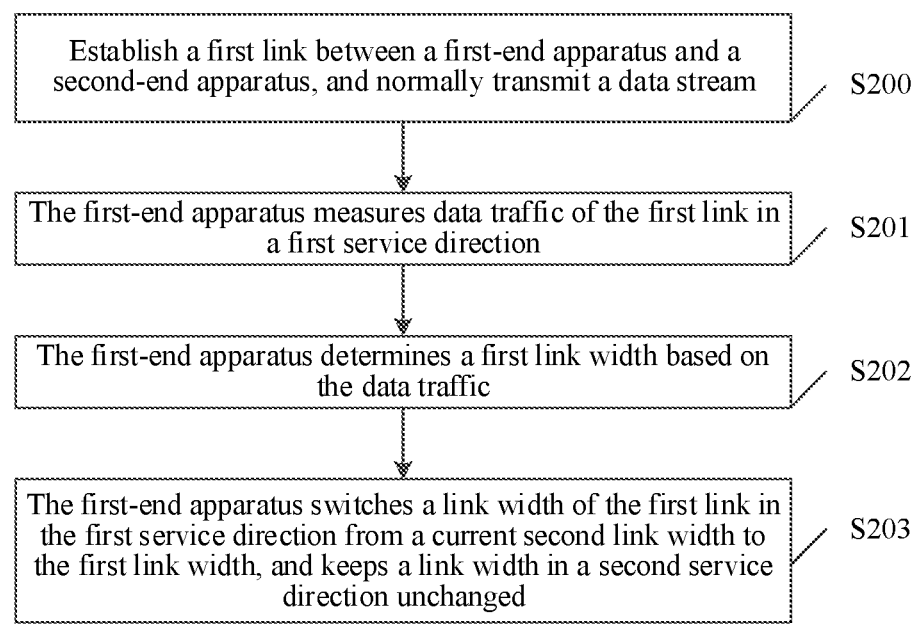
FIG. 3 is a flowchart of a link width adjustment method according to an embodiment of this application.

FIG. 3 is a flowchart of a link width adjustment method according to an embodiment of this application. As shown in FIG. 3, the method may include the following steps.

Step S200: Establish a first link between a first-end apparatus and a second-end apparatus, and normally transmit a data stream.

The first-end apparatus may include any serial port, and the second-end apparatus may indicate a remote apparatus communicating with the first-end apparatus. The first link indicates a link between the first-end apparatus and the second-end apparatus. The first link may be a unidirectional link or a bidirectional link. In an example, the first-end apparatus, the second-end apparatus, and the first link may be respectively the first-end apparatus 11, the second-end apparatus 12, and the link 13 shown in FIG. 1a. During communication, the first-end apparatus may send a data stream to the second-end apparatus, or may receive a data stream sent by the second-end apparatus.

During implementation, the PMU and the BWM shown in FIG. 2b may be disposed in the first-end apparatus. After the first link is successfully established, the first-end apparatus may enable the PMU and the BWM to start working. Step S201 is performed by the PMU to output data traffic. After receiving the data traffic output by the PMU, the BWM may perform step S202 to determine whether to adjust a link width. When the link width needs to be adjusted, the BWM notifies a MAC or a PHY to perform step S203, to adjust the link width. It is considered that the PMU can output data traffic in one service direction or data traffic in two service directions. Therefore, the BWM may determine whether the link width needs to be adjusted for each service direction, and notify the MAC layer or the PHY layer to adjust the link width in the service direction in which the link width needs to be adjusted.

Step S201: The first-end apparatus measures data traffic of the first link in a first service direction.

The first service direction may be a sending direction or a receiving direction. When the first service direction is the sending direction, traffic monitoring and link width adjustment for the first link in the sending direction may be implemented in this embodiment of this application. When the first service direction is the receiving direction, traffic monitoring and link width adjustment for the first link in the receiving direction may be implemented in this embodiment of this application. Certainly, traffic monitoring and link width adjustment for the first link in the sending direction and in the receiving direction may alternatively be implemented at the same time in this embodiment of this application.

In a possible implementation, bandwidth usage may indicate data traffic. In an example, the bandwidth usage may be a ratio of an average occupied bandwidth in the first service direction of the first link in a first time interval to a total bandwidth in the first service direction. For example, the bandwidth usage may be 30%, 55%, or 80%. The first time interval may indicate a period for collecting statistics on the bandwidth usage. The first time interval may be set as required, for example, may be 10 minutes, 1 hour, or 1 day. Setting of the first time interval is not limited in this embodiment of this application.

Step S202: The first-end apparatus determines a first link width based on the data traffic.

In this embodiment of this application, one or more traffic ranges may be set, and a corresponding link adjustment manner may be configured for each traffic range. In an example, the link adjustment manner may include setting the link width to twice an original value, setting the link width to four times an original value, setting the link width to ½ of an original value, setting the link width to ¼ of an original value, or setting the link width to a specific value (for example, 2, 4, 8, or 16). It may be understood that, when a boundary value of the traffic range is large, the link adjustment manner includes a manner of increasing the link width, or when a boundary value of the traffic range is small, the link adjustment manner includes a manner of reducing the link width. A first traffic range may indicate any one of the one or more traffic ranges. The first-end apparatus may determine a traffic range of the data traffic. When the data traffic falls within the first traffic range, the first-end apparatus may determine the first link width based on a link adjustment manner corresponding to the first traffic range. The first link width herein indicates a required link width, that is, a target link width.

In the case of a plurality of traffic ranges, the link width can be adjusted by a plurality of levels. For example, the bandwidth usage is used as the data traffic. When the bandwidth usage is 30%, which falls within a range of 10% to 40%, the link width may be set to ½ of the original value. If the bandwidth usage is 60%, which falls within a range of 50% to 70%, the link width may be set to ¼ of the original value. In this way, fine-grained adjustment is implemented, flexibility is improved, and power consumption is reduced.

Step S203: The first-end apparatus switches a link width of the first link in the first service direction from a current second link width to the first link width, and keeps a link width in a second service direction unchanged.

Herein, the second service direction is opposite to the first service direction, and the first-end apparatus may adjust the link width of the first link in the first service direction from the current second link width to the first link width, to implement link width adjustment for the first link in the first service direction. The first-end apparatus keeps the link width in the second service direction unchanged, to implement independent link width adjustment in the first service direction and the second service direction.

The first time interval, the measured service direction, the one or more traffic ranges, and the adjustment manner corresponding to each traffic range may be preset in the first-end apparatus. The first time interval, the measured service direction, the one or more traffic ranges, and the adjustment manner corresponding to each traffic range may be statically unchanged, or may be dynamically adjustable. This is not limited in this application.

In this embodiment of this application, the data traffic in the first service direction is measured, and when link width switching is performed in the first service direction based on the data traffic, the link width in the second service direction is kept unchanged. In this way, independent link width adjustment is implemented in the first service direction and the second service direction, to resolve problems of power consumption and an insufficient bandwidth.

In a possible implementation, the method shown in FIG. 3 may further include: when the data traffic falls within an adjustment range, increasing a quantity of trigger times by 1; when the data traffic falls beyond an adjustment range, clearing a quantity of trigger times; or when a quantity of trigger times reaches a trigger threshold, determining a traffic range of the data traffic; and then, when the data traffic falls within the first traffic range, determining the first link width based on the link adjustment manner corresponding to the first traffic range.

The adjustment range may be used to determine whether there is a link width adjustment requirement currently. If the data traffic falls within the adjustment range, it indicates that there is a link width adjustment requirement. If the data traffic falls beyond the adjustment range, it indicates that there is no link width adjustment requirement. The adjustment range may be set as required. In an example, the adjustment range may be greater than 90% (indicating that traffic is heavy and the link width needs to be increased) or less than 50% (indicating that traffic is light and the link width may be reduced). It should be noted that adjustment ranges corresponding to the sending direction and the receiving direction may be the same or different. This is not limited in this application. In this embodiment of this application, adjustment ranges may alternatively be separately set to increase the link width and reduce the link width.

During actual application, there is a case in which data traffic increases or decreases temporarily. In this case, after the link width is adjusted, the link width may need to be adjusted again in a short period of time. Considering that enabling and disabling a channel requires specific time and resources, in this embodiment of this application, when a link width adjustment requirement is detected in a plurality of consecutive periods (for example, a plurality of first time intervals), an adjustment manner is determined, and link width adjustment is performed.

The trigger threshold may be used to determine whether to trigger a link width switching operation. The link width switching operation includes: determining a traffic range of data traffic, and determining the first link width based on an adjustment manner corresponding to the traffic range of the data traffic, to implement link width switching. The trigger threshold may be set as required. In an example, the trigger threshold may be 5 or 8. For example, the trigger threshold is 5, indicating that the link width switching operation is triggered when the link width adjustment requirement is detected in five consecutive periods.

In this embodiment of this application, if data traffic of the first link in the first service direction in a first time period falls within the adjustment range, the quantity of trigger times may be increased by 1; or when data traffic falls beyond the adjustment range, clearing the quantity of trigger times. In this way, the quantity of trigger times may indicate a quantity of link width adjustment requirements that are continuously detected.

In the case of a plurality of adjustment ranges, a corresponding trigger threshold and a corresponding quantity of trigger times may be set for each adjustment range. During implementation, the adjustment range, the quantity of trigger times, and the trigger threshold may be preset in the first-end apparatus. The adjustment range, the quantity of trigger times, and the trigger threshold may be statically unchanged, or may be dynamically adjustable. This is not limited in this application.

The method shown in FIG. 3 may be implemented by using hardware logic, or may be implemented by using software.

It is considered that data stream transmission is implemented between the first-end apparatus and the second-end apparatus on the first link. When the first-end apparatus adjusts the link width of the first link in the first service direction, specific impact is caused on the second-end apparatus. For example, when the first-end apparatus adjusts the link width of the first link in the sending direction, the second-end apparatus needs to process the received data stream based on an adjusted link width. When the first-end apparatus adjusts the link width of the first link in the receiving direction, the second-end apparatus needs to send the data stream based on an adjusted link width. In this embodiment of this application, when adjusting the link width of the first link in the first service direction, the first-end apparatus needs to negotiate with the second-end apparatus.

In a related technology, in a negotiation process for increasing a link width, a training mode needs to be switched to. This causes interruption of data stream transmission, and causes adverse impact to a service. An embodiment of this application provides a link width adjustment method, so that a link width can be adjusted when data stream transmission is ensured.

In this embodiment of this application, a link width negotiation process includes two steps: (1) a link width switching request and response; and (2) link width alignment.

Figure 4A:
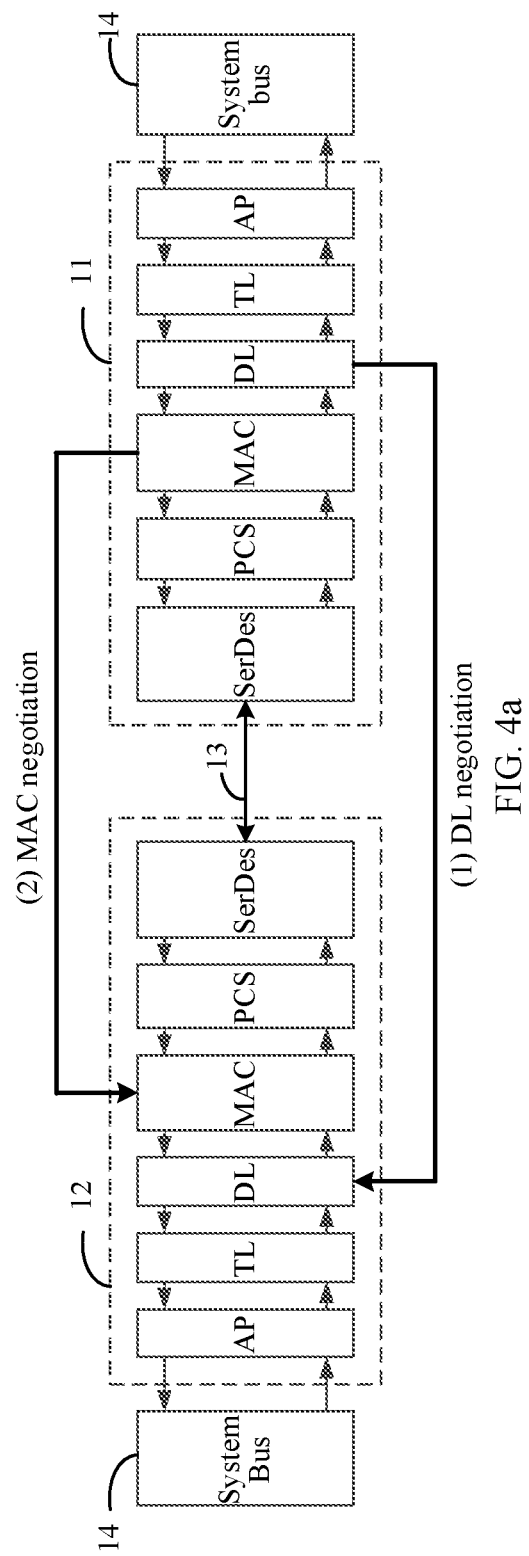
FIG. 4a is a schematic architectural diagram of an end-to-end connection system according to an embodiment of this application.

FIG. 4a is a schematic architectural diagram of an end-to-end connection system according to an embodiment of this application. As shown in FIG. 4a, the connection system includes a first-end apparatus 11 and a second-end apparatus 12. For a hierarchical structure of the first-end apparatus 11, refer to the hierarchical schematic diagram shown in 2b. For a hierarchical structure of the second-end apparatus 12, refer to the hierarchical structure of the first-end apparatus 11.

As shown in FIG. 4a, a link 13 is established between the first-end apparatus 11 and the second-end apparatus 12, and the link 13 is equalized at a full width. The first-end apparatus 11 stores a feed forward equalization (Feed Forward Equalization, FFE) parameter and a continuous-time linear equalization (Continuous-time linear equalization, CTLE) parameter of a current SerDes. The second-end apparatus also stores the current FFE parameter and CTLE parameter.

During communication, the first-end apparatus 11 initiates a link width negotiation process when determining, by using the method shown in FIG. 3, that a link width of the link 13 in a first service direction needs to be adjusted, or when receiving an indication, sent by a user, for adjusting a link width of the link 13 in a first service direction, to determine a final link width through negotiation.

In a possible implementation, as shown in FIG. 4a, step (1) in the link width negotiation process may be implemented through DL negotiation, and step (2) may be implemented through MAC negotiation.

For example, the first-end apparatus 11 needs to switch a link width of the link 13 in a sending direction to a first link width. In a DL negotiation process, a DL (that is, a first DL) of the first-end apparatus 11 sends, to a DL (that is, a second DL) of the second-end apparatus 12, a first packet that carries first indication information indicating to perform link width switching. When agreeing to perform link width switching, the DL of the second-end apparatus 12 returns, to the DL of the first-end apparatus 11, second indication information indicating that the link width switching is agreed on. After receiving a second packet, the DL of the first-end apparatus 11 may indicate a MAC layer (that is, a first MAC layer) of the first-end apparatus 11 to perform an action of increasing or reducing the link width based on the first link width, and perform MAC negotiation with a MAC layer (that is, a second MAC layer) of the second-end apparatus 12, to perform link width alignment.

The action of increasing the link width includes: First, the MAC layer of the first-end apparatus 11 enables some or all of channels, of the current link 13, currently in a disabled state in the sending direction, where a channel used to transmit a data stream before the link width switching is referred to as a first channel, and a newly enabled channel is referred to as a second channel. In an example, when the second channel is enabled, a common-mode voltage and decision feedback equalizer corresponding to the second channel may be enabled, to exit a low power consumption state and increase the link width. The MAC layer of the first-end apparatus 11 sends, to the MAC layer of the second-end apparatus 12 on the second channel, a first bit stream used to train the second channel for data communication, so that the second-end apparatus 12 detects whether data communication can be performed on the second channel. If the second-end apparatus 12 determines that data communication can be performed on the second channel, the DL of the second-end apparatus 12 sends, to the DL of the first-end apparatus 11, a third packet that carries third indication information indicating that data communication can be performed on the second channel. If the second-end apparatus 12 finds that a bit error rate of the first bit stream received from the second channel is high, in other words, data communication cannot be normally performed on the second channel, the second-end apparatus 12 controls the SerDes to adjust the FFE parameter and the CTLE parameter, and detects again whether data communication can be performed on the second channel. After the first-end apparatus 11 receives the third packet fed back by the second-end apparatus 12, the MAC layer of the first-end apparatus 11 sends, to the MAC layer of the second-end apparatus 12 through the first channel and the second channel, a second bit stream indicating the first link width, so that the second-end apparatus 12 may process, based on the first link width, a data stream subsequently received from the first-end apparatus 11. In an example, the second bit stream may be sent between data streams, or may be carried in a data stream for sending. This is not limited in this embodiment of this application.

In this embodiment of this application, before enabling the second channel, the first-end apparatus has sent the first packet through the DL to complete a handshake with the second-end apparatus. After receiving the first packet, the second-end apparatus may cooperate with the first-end apparatus to enable the common-mode voltage and decision feedback equalizer. In this way, the second channel can work normally as soon as possible, and channel enabling time is reduced.

In addition, after the second channel is enabled, the first-end apparatus continuously sends the first bit stream through the second channel, until the second-end apparatus can determine that data communication can be performed on the second channel, and then the first-end apparatus transmits the data stream through the second channel. In this way, a service error caused because data communication cannot be normally performed on the second channel can be avoided.

In addition, after a period of time, if the second-end apparatus still cannot normally receive the first bit stream on the second channel, the second-end apparatus immediately adjusts PHY parameters (including the FFE parameter and the CTLE parameter), so that a receive equalizer of the PHY returns to a normal state.

The action of reducing the link width includes: First, the MAC layer of the first-end apparatus 11 sends, to the MAC layer of the second-end apparatus 12 through the first channel, the second bit stream carrying the first link width, so that the second-end apparatus 12 can subsequently perform processing based on the first link width. After sending the second bit stream, the MAC of the first-end apparatus 11 may disable a part of the first channel, to obtain a third channel. In an example, when a channel is disabled, a common-mode voltage and decision feedback equalizer corresponding to the disabled channel may be disabled, to enter the low power consumption state and reduce power consumption.

In this embodiment of this application, before disabling a channel in the sending direction, the first-end apparatus has sent the first packet through the DL to complete a handshake with the second-end apparatus. After receiving the first packet, the second-end apparatus may cooperate with the first-end apparatus to disable the common-mode voltage and decision feedback equalizer. In this way, power consumption of the second-end apparatus is reduced.

It may be understood that, in the foregoing process, work of the first-end apparatus in a receiving direction is not affected. It should be noted that, in the DL negotiation process, the first packet of the first-end apparatus 11 may be sent on a channel that does not participate in switching in the sending direction (that is, a channel that is always in an enabled state before and after the link width switching), to improve reliability. A quantity of disabled channels or enabled channels may be determined based on the first link width and a current second link width. For example, if the first link width is 4, and the second link width is 2, the quantity of enabled channels is 2. If the first link width is 4, and the second link width is 8, the quantity of disabled channels is 4. A specific channel to be disabled or a specific channel to be enabled may be determined by parameters such as channel transmission quality and a channel transmission rate. For example, the first-end apparatus may determine the to-be-disabled channel from channels currently in the enabled state in ascending order of channel transmission quality or in ascending order of channel transmission rates. The first-end apparatus may determine the to-be-enabled channel from channels currently in the disabled state in descending order of historical transmission quality or in descending order of historical channel transmission rates. Certainly, a channel enabling sequence and a channel disabling sequence may alternatively be preset in the first-end apparatus. When a channel needs to be enabled or disabled, the to-be-enabled channel or the to-be-disabled channel is determined according to the preset sequence.

In a possible implementation, the first packet, the second packet, and the third packet may be data link flits (Data Link Flits, DLFs). FIG. 4b shows an example data structure of a DLF. As shown in FIG. 4b, the DLF includes 16 bytes (which may also be referred to as field segments). A byte 0 indicates a packet type. When a value of the byte 0 is 0xA0, it indicates that the DLF is a link management packet and is used for link management. A byte 1 indicates a link management type. When a value of the byte 1 is 0×1, it indicates that the DLF is a link width management packet and is used for link width management. A byte 2 and a byte 3 indicate that the DLF is a request packet and a response packet, respectively. It should be noted that the byte 2 and the byte 3 are mutually exclusive bytes, and a value of only one of the two bytes is not 0. The byte 2 may carry an identifier of a service direction to be adjusted (that is, the first service direction in this embodiment of this application). The byte 3 may be used to determine a negotiation success or failure. A byte 4 and a byte 5 indicate a target link width in the sending direction and a target link width in the receiving direction respectively (that is, the first link width in this embodiment of this application). A byte 6 to a byte 13 are reserved bytes, and a byte 14 and a byte 15 are used for check.

In a possible implementation, the first bit stream may be a retraining sequence (Retrain TS Block, RTSB). FIG. 4c shows an example data structure of an RTSB. As shown in FIG. 4c, the RTSB includes 16 bytes. A byte 0 indicates a function of the RTSB. A byte 1 to a byte 11 are reserved bytes, a byte 12 and a byte 13 are used for check, and a byte 14 and a byte 15 indicate balance values. It should be noted that, a length of the RTSB may be 16 bytes shown in FIG. 4c, or may be smaller or larger, provided that the RTSB can be used to implement retraining of an enabled channel. A structure of the RTSB is not limited in embodiments of this application.

In a possible implementation, the second bit stream may be an alignment marker (Alignment Marker, AM). FIG. 4d shows an example data structure of an AM. As shown in FIG. 4d, the AM includes 20 bytes. The AM is divided into four spaces in a unit of 5 bytes. A format of each space is consistent, and the space is repeated four times. Each space includes a unique identifier (Unique Maker, UM), and specifically includes a UM 0 and a UM 1. The UM indicates a function of the AM, and the UM further includes a negotiated link width (for example, the first link width). In the AM, a value of a byte is repeated four times to improve reliability.

The first packet, the second packet, the third packet, the first bit stream, and the second bit stream may implement corresponding functions, and data structures of the first packet, the second packet, the third packet, the first bit stream, and the second bit stream are not limited to the structures shown in FIG. 4b to FIG. 4d. Data structures of a negotiation packet, the second bit stream, and the first bit stream are not limited in embodiments of this application.

Figure 4E:
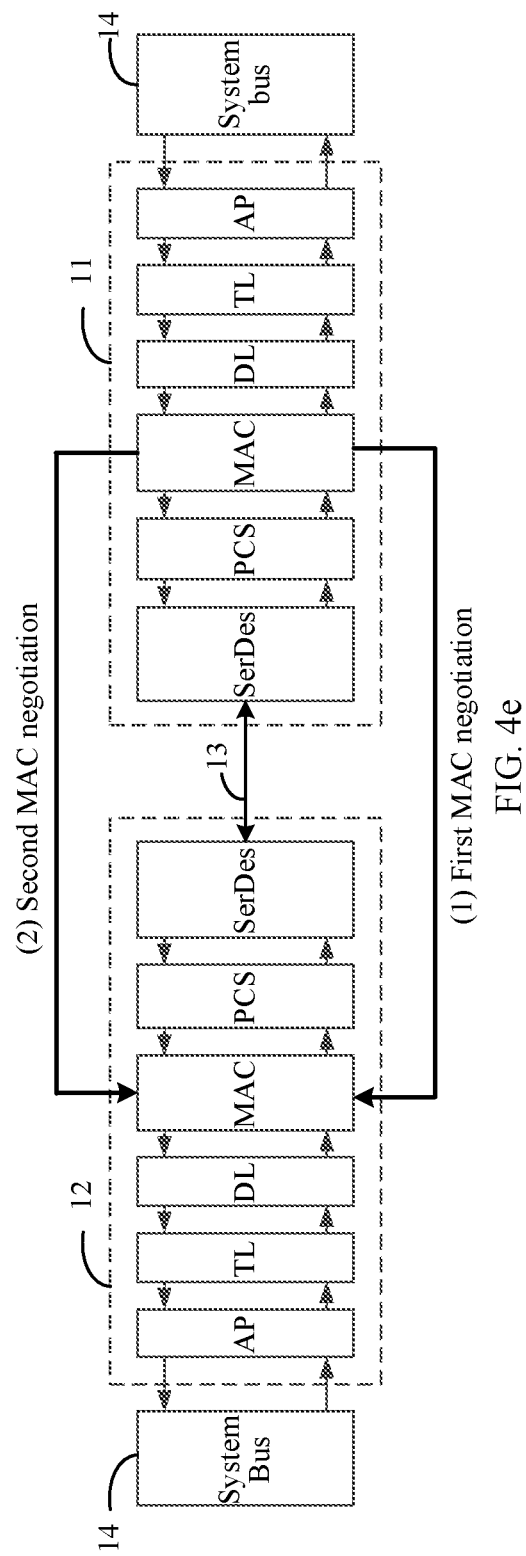
FIG. 4e is a schematic architectural diagram of an end-to-end connection system according to an embodiment of this application.

In a possible implementation, FIG. 4e is a schematic architectural diagram of an end-to-end connection system according to an embodiment of this application. As shown in FIG. 4e, both step (1) and step (2) in the link width negotiation process may be implemented through MAC negotiation. The following distinguishes the first MAC negotiation and the second MAC negotiation.

For ease of description and distinguishing, in embodiments of this application, a first AM indicates the first packet whose data structure conforms to the AM format, a second AM indicates the second packet whose data structure conforms to the AM format, and a third AM indicates the third packet whose data structure conforms to the AM format.

For example, the first-end apparatus 11 needs to switch the link width of the link 13 in the sending direction to the first link width. In the first MAC negotiation process, the MAC layer (that is, the first MAC layer) of the first-end apparatus 11 sends, to the MAC layer (that is, the second MAC layer) of the second-end apparatus 12, the first AM that carries the first indication information indicating to perform link switching. When determining that link switching can be performed, the MAC layer of the second-end apparatus 12 returns, to the MAC layer of the first-end apparatus 11, the second AM that carries the second indication information indicating that the link switching is agreed on. After receiving the second AM, the MAC layer of the first-end apparatus 11 may perform the action of increasing or reducing the link width, and may perform the second MAC negotiation with the MAC layer of the second-end apparatus 12. For the action of reducing the link width, the action of increasing the link width, and the second MAC negotiation with the MAC layer of the second-end apparatus 12, refer to the action of reducing the link width, the action of increasing the link width, and the MAC negotiation with the MAC layer of the second-end apparatus 12 in FIG. 4a. Details are not described herein again.

In a possible implementation, reference may be made for the data structures of the first AM, the second AM, the third AM (involved in the action of increasing the link width), the first bit stream (involved in the action of increasing the link width), and the second bit stream (involved in the action of reducing the link width and the action of increasing the link width).

An AM is a bit stream with a specific length and a specific format. The AM is essentially a sequence, and the format of the AM may be referred to as an AM format. A packet or a bit stream may be constructed based on the AM format. In this case, a data structure of the constructed packet or bit stream conforms to the AM format. FIG. 4f shows an example data structure of a packet conforming to an AM format. As shown in FIG. 4f, AM_ID 0 to AM_ID N are used to identify whether a bit stream transmitted on a channel is a bit stream in the AM format or a service-related data stream. To ensure a specific fault tolerance capability, the bit stream in the AM format may be constructed through encoding using a Hamming code, and is repeated N+1 times from AM_ID 0 to AM_ID N. N is a positive integer and may be set as required. For example, N may be set to 3. The second-end apparatus may perform error detection and correction on the received data stream according to an error detection and correction principle of the Hamming code, to ensure that the first AM, the second AM, the third AM, the first bit stream, and the second bit stream can be correctly identified from other bit streams. A length of an AM_ID may be self-defined, for example, 4 bytes. AM_END indicates an end of the AM. The AM ends after AM_END after a length of AM_Payload. The MAC layer of the second-end apparatus 12 may find, based on the foregoing AM_ID, AM_END, and AM_Payload, a start location and an end location of the AM from a bit stream recovered by the SerDes.

AM_Payload is classified into AM_Payload_Type and AM_Payload_Detail, and is used to carry physical layer control information. AM_Payload_Type indicates a type of the AM, and AM_Payload_Detail indicates specific information carried in the AM. FIG. 4g is a schematic diagram of an example of an AM type and carried specific information.

As shown in FIG. 4g, a length of the AM type is 1 byte. When a value of the zeroth bit of the type is 1, it indicates that an AM is a request packet for adjusting the link width in the sending direction. When a value of the first bit is 1, it indicates that an AM is a request packet for adjusting the link width in the receiving direction. When a value of the second bit is 1, it indicates that an AM is a response packet of a request for adjusting the link width in the sending direction. When a value of the third bit is 1, it indicates that an AM is a response packet of a request for adjusting the link width in the receiving direction. When a value of the fourth bit is 1, it indicates that an AM is a response packet indicating that the link width in the receiving direction is successfully increased. When a value of the fifth bit is 1, it indicates that an AM is a request packet for starting link width adjustment in the sending direction. The sixth bit and the seventh bit are reserved bits. It may be understood that values of the bits of the type are mutually exclusive, that is, when a value of a bit of the type is 1, values of other bits are 0.

As shown in FIG. 4g, a length of the specific information carried in the AM is 2 bytes. When the value of the zeroth bit, the first bit, or the fifth bit of the type is 1 (that is, the AM is the request packet), the specific information carried in the AM may include the link width in the sending direction. When the value of the second bit or the third bit of the type is 1 (that is, the AM is the response packet), the specific information carried in the AM may include the link width in the receiving direction.

It may be understood that the lengths of the type of the AM and the specific information carried in the AM may alternatively be other lengths, for example, 2 bytes and 4 bytes. This is not limited in embodiments of this application.

Figure 5A:
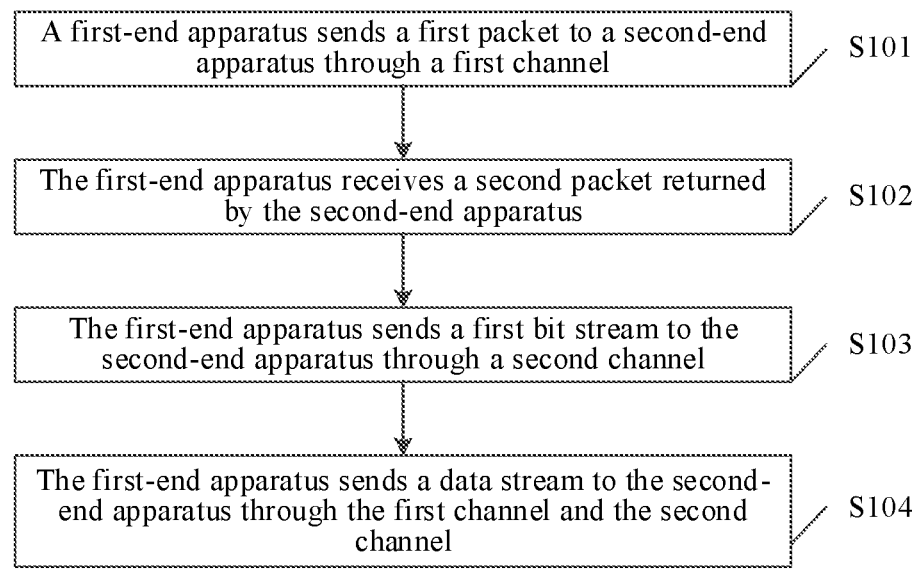
FIG. 5a is a flowchart of a link width adjustment method according to an embodiment of this application.

FIG. 5a is a flowchart of a link width adjustment method according to an embodiment of this application. The method is applied to a first-end apparatus. As shown in FIG. 5a, the method may include the following steps.

Step S101: The first-end apparatus sends a first packet to a second-end apparatus through a first channel.

The first packet carries first indication information, and the first indication information may indicate to perform link width switching. In a possible implementation, the first packet carries a first link width, and the first link width indicates a target link width. In this way, the second-end apparatus may determine, based on the first link width, whether to agree to perform link width switching.

Step S102: The first-end apparatus receives a second packet returned by the second-end apparatus.

The second packet carries second indication information, and the second indication information may indicate that the link width switching is agreed on.

In this embodiment of this application, a link width switching request and response may be implemented through the foregoing step S101 and step S102. The first channel may indicate a channel in an enabled state from the first-end apparatus to the second-end apparatus. Channels in two directions between the first-end apparatus and the second-end apparatus are independent of each other. Therefore, a channel (that is, the first channel) used by the first-end apparatus to send the first packet and a channel used by the first-end apparatus to receive the second packet are different channels. This is not limited in this embodiment of this application.

In a possible implementation, data structures of the first packet and the second packet conform to a DLF format. In this case, the first packet may be referred to as a first DL, and the second packet may be referred to as a second DL. Step S101 may include: The first-end apparatus sends the first DLF to the second DL through a first DL and the first channel. Step S102 may include: The first-end apparatus receives, through the first DL, the second DLF sent through a second DL. The first DLF carries the first indication information, the first indication information includes a first identifier and the first link width, the first identifier indicates that the first DLF is a request packet for adjusting a link width in a sending direction, and the first link width indicates the target link width. The second DLF includes the second indication information, the second indication information includes a second identifier and the first link width, and the second identifier indicates that the second DLF is a response indicating an agreement on the request for adjusting the link width in the sending direction.

In a possible implementation, data structures of the first packet and the second packet may conform to an AM format. In this case, the first packet may be referred to as a first AM, and the second packet may be referred to as a second AM. Step S101 may include: The first-end apparatus sends the first AM to a second MAC layer through a first MAC layer and the first channel. Step S102 may include: The first-end apparatus receives the second AM returned by the second-end apparatus. The first AM carries the first indication information indicating to perform link switching. The second AM carries the second indication information indicating that the link width switching is agreed on.

It may be understood that, after the first-end apparatus and the second-end apparatus complete the link width switching request and response, link width alignment may be performed. When a negotiated link width is greater than a link width used before negotiation, the first-end apparatus needs to enable the second channel to increase the link width. When the first packet and the second packet are packets in the DLF format, after receiving the second DLF through the first DL, the first-end apparatus may send a first indication to the first MAC layer through the first DL, to cause the first MAC layer to enable the second channel. When the first packet and the second packet are packets in the AM format, after the first-end apparatus receives the second AM through the first MAC, the first MAC may directly enable the second channel.

Step S103: The first-end apparatus sends a first bit stream to the second-end apparatus through the second channel.

The first bit stream is used to train the first channel for data communication.

In a possible implementation, a data structure of the first bit stream may be in an RTSB format. Step S103 may include: The first-end apparatus sends the first bit stream to the second MAC layer through the first MAC layer and the second channel.

In a possible implementation, after performing step S103, the first-end apparatus may receive a third packet sent by the second-end apparatus, where the third packet carries third indication information indicating that data communication can b e performed on the second channel.

In an example, a data structure of the third packet conforms to the DLF format. In this case, the third packet may be referred to as a third DLF. That the first-end apparatus receives a third packet sent by the second-end apparatus may include: The first-end apparatus receives, through the first DL, the third DLF sent through the second DL, where the third DLF includes the third indication information, the third indication information includes a third identifier, and the third identifier indicates that data communication can be performed on the second channel.

Then, the first-end apparatus may send a second indication to the first MAC layer through the first DL, to cause the first MAC to send a data stream to the second MAC layer through the first channel and the second channel (corresponding to step S104).

In another example, the data structure of the third packet conforms to the AM format. In this case, the third packet may be referred to as a third AM. That the first-end apparatus receives a third packet sent by the second-end apparatus may include: The first-end apparatus receives the third AM sent by the second-end apparatus, where the third AM carries the third indication information indicating that data communication can be performed on the second channel. Specifically, the first MAC receives the third AM sent by the second MAC. Then, the first MAC may send a data stream to the second MAC layer through the first channel and the second channel (corresponding to step S104).

Step S104: The first-end apparatus sends a data stream to the second-end apparatus through the first channel and the second channel.

The first channel is a channel that has been enabled before link width switching negotiation and that is used by the first-end apparatus to send the data stream to the second-end apparatus. The second channel is a channel that is enabled after the link width switching negotiation and that is used by the first-end apparatus to send the data stream to the second-end apparatus. It can be learned that, after the link width switching negotiation is completed, both the first channel and the second channel are used to transmit the data stream, so that the link width is increased. In step S104, the first-end apparatus may send the data stream to the second-end apparatus through both the first channel and the second channel, to improve efficiency of sending the data stream. During specific implementation, the first MAC sends the data stream to the second MAC through the first channel and the second channel, so that the first-end apparatus sends the data stream to the second-end apparatus through the first channel and the second channel.

In consideration of a link width change, to facilitate unpacking of the data stream, link width alignment needs to be performed between the first-end apparatus and the second-end apparatus. In an example, before step S104, the first-end apparatus may send a second bit stream to the second-end apparatus through the first channel and the second channel, where the second bit stream indicates a link width for sending the data stream. In another example, the data stream sent in step S104 may include a second bit stream, and the second bit stream indicates a link width for sending the data stream. The link width for sending the data stream in step S104 is a link width (that is, a second link width) obtained through the link width switching negotiation. In this way, the link width for sending the data stream in S104 is synchronized to the second-end apparatus. This helps the second-end apparatus accurately unpack the data stream.

In this embodiment of this application, the first bit stream used for channel training for data communication is sent on the newly enabled second channel to enable the second channel, so that normal data stream transmission in an entire channel link width switching process can be ensured, a problem of data stream interruption caused by channel link width switching is resolved, and reliability is improved.

Figures 1, 5B:
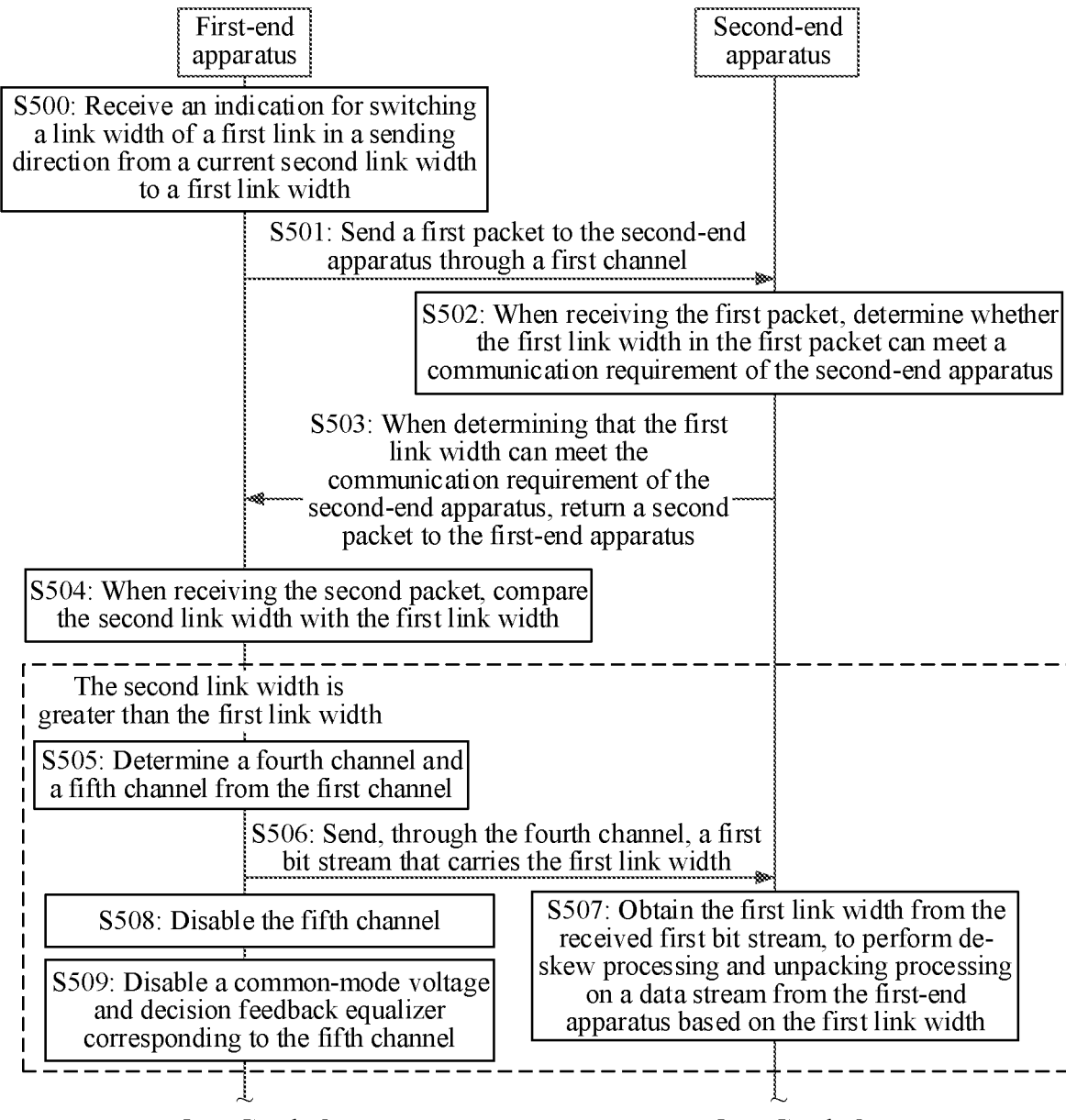
FIG. 5b-1 and FIG. 5b-2 are a schematic interaction diagram of a link width adjustment method according to an embodiment of this application.
Figures 2, 5B:
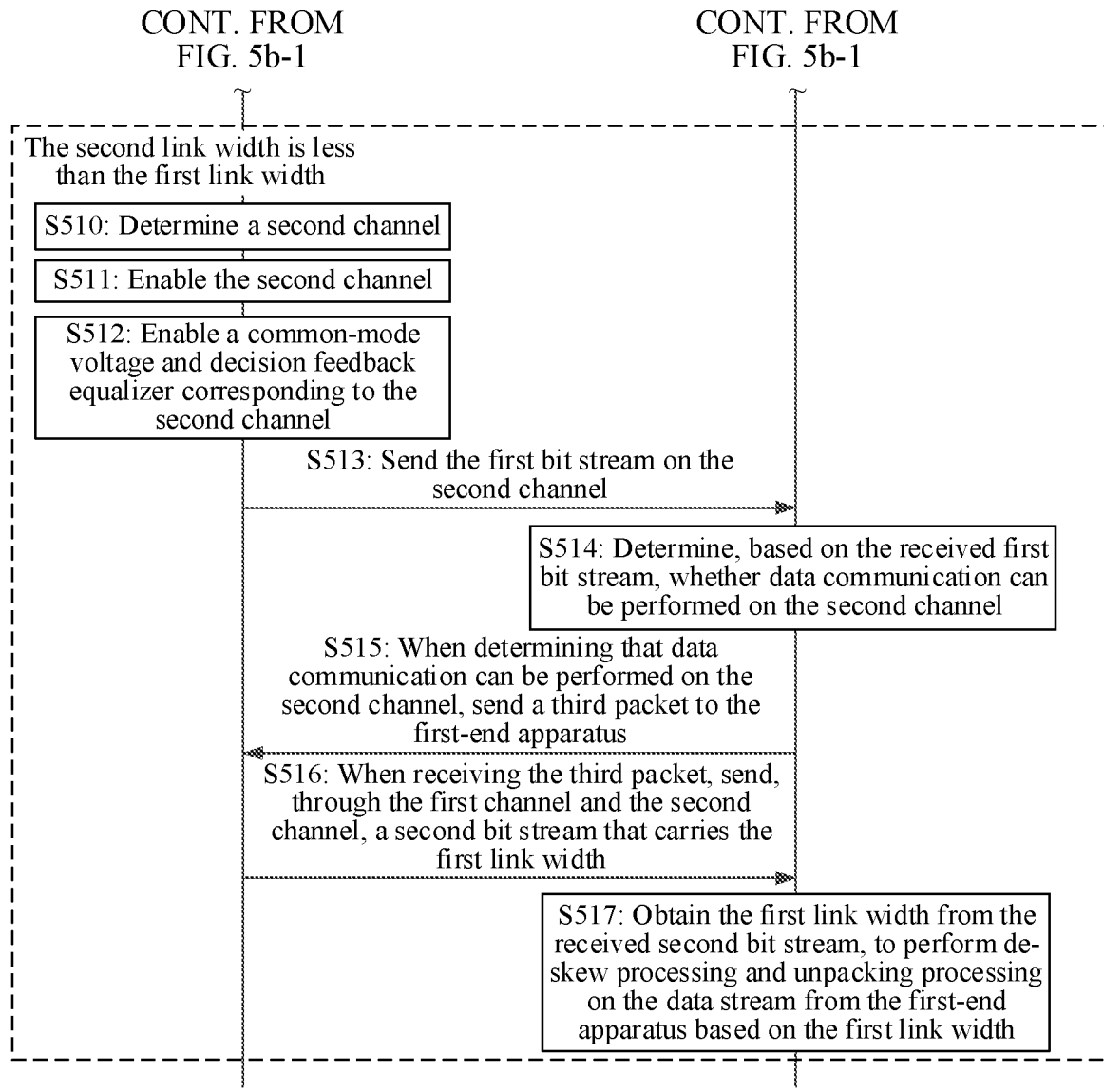

The following describes a link width negotiation process in detail with reference to FIG. 5b-1 and FIG. 5b-2. FIG. 5b-1 and FIG. 5b-2 are a schematic interaction diagram of a link width adjustment method according to an embodiment of this application. As shown in FIG. 5b-1 and FIG. 5b-2, the method includes the following steps.

Step S500: A first-end apparatus receives an indication for switching a link width of a first link in a sending direction from a current second link width to a first link width.

In an example, the indication may be generated when the first-end apparatus finds that the first link width is different from the current second link width and needs to perform link width switching after determining the first link width through step 202 shown in FIG. 3. In another example, the indication may alternatively be sent by a user to the first-end apparatus.

Step S501: The first-end apparatus sends a first packet to a second-end apparatus through a first channel.

The first packet carries the first link width, and the first link width indicates a target link width.

Step S502: When receiving the first packet, the second-end apparatus determines whether the first link width in the first packet can meet a communication requirement of the second-end apparatus.

The first link width in the first packet indicates the first link width of the first-end apparatus in the sending direction. The second-end apparatus may obtain the first link width from the first packet. The second-end apparatus may determine whether the first link width of the first-end apparatus in the sending direction can meet a communication requirement of the second-end apparatus in a receiving direction.

The following describes a manner in which the second-end apparatus determines whether the first link width can meet the communication requirement in the receiving direction of the second-end apparatus.

In a possible implementation, when receiving the first packet, the second-end apparatus may directly determine that the first link width of the first-end apparatus in the sending direction can meet the communication requirement of the second-end apparatus. In this way, when the second-end apparatus receives the first packet, the second-end apparatus may directly return a second packet to the first-end apparatus.

In a possible implementation, when currently determining that data traffic received by the second-end apparatus matches the first link width, the second-end apparatus may determine that the first link width of the first-end apparatus in the sending direction can meet the communication requirement of the second-end apparatus. For example, bandwidth usage is used as the data traffic. When current bandwidth usage is 30% and the first link width is half of a current link width, data receiving of the second-end apparatus is not affected if a link width of the second-end apparatus in the receiving direction is reduced by half. In this case, the second-end apparatus may determine that the first link width of the first-end apparatus in the sending direction can meet the communication requirement of the second-end apparatus. When current bandwidth usage is 80% and the first link width is half of a current link width, data receiving of the second-end apparatus is affected if a link width of the second-end apparatus in the receiving direction is reduced by half In this case, the second-end apparatus may determine that the first link width cannot meet the communication requirement of the second-end apparatus.

In a possible implementation, when data traffic received by the second-end apparatus after a period of time matches the first link width, the second-end apparatus may determine that the first link width of the first-end apparatus in the sending direction can meet the communication requirement of the second-end apparatus. Alternatively, the second-end apparatus may determine, in another manner, whether the first link width in the first packet can meet the communication requirement of the second-end apparatus. This is not limited in this application. In an example, the second-end apparatus receives an indication of the user, and after a period of time, received data traffic increases or decreases due to a service reason. In this case, the second-end apparatus may match the data traffic received after the period of time with the first link width. For example, bandwidth usage is used as the data traffic. When current bandwidth usage is 30%, the first link width is half of a current link width, and the data traffic received after the period of time is doubled, data receiving of the second-end apparatus after the period of time is affected if a link width of the second-end apparatus in the receiving direction is reduced by half In this case, the second-end apparatus may determine that the first link width cannot meet the communication requirement of the second-end apparatus.

Step S503: When determining that the first link width can meet the communication requirement of the second-end apparatus, the second-end apparatus returns the second packet to the first-end apparatus.

Step S504: When receiving the second packet, the first-end apparatus compares the second link width with the first link width.

As shown in FIG. 5b-1 and FIG. 5b-2, when the second link width is greater than the first link width, it indicates that the first-end apparatus needs to reduce the link width in the sending direction. In this case, step S505 to step S509 may be performed.

Step S505: The first-end apparatus determines a fourth channel and a fifth channel from the first channel.

The fourth channel indicates a channel that does not need to be disabled in the first channel, and the fifth channel indicates a channel that needs to be disabled in the first channel.

A quantity of fourth channels may be determined based on the first link width and the second link width. For example, when the first link width is ½ of the second link width, the quantity of fourth channels may be ½ of a total quantity of first channels. When the first link width is ¼ of the second link width, the quantity of fourth channels may be ¼ of a total quantity of first channels. The fourth channel may be determined according to a preset sequence, or the fourth channel may be determined in descending order of channel transmission quality or in descending order of transmission speeds. The quantity of fourth channels and the determining sequence are not limited in this application. In this embodiment of this application, a channel other than the fourth channel in the first channel is the fifth channel.

Step S506: The first-end apparatus sends, through the fourth channel, a first bit stream that carries the first link width.

In an example, the first-end apparatus may send the first bit stream only through the fourth channel. In this way, an amount of data can be reduced. In another example, the first-end apparatus may send the first bit stream through the first channel and the fifth channel. In this way, reliability can be improved.

Step S507: The second-end apparatus obtains the first link width from the received first bit stream, to perform de-skew processing and unpacking processing on the data stream from the first-end apparatus based on the first link width.

For the de-skew (de-skew) processing and the unpacking processing, refer to a related technology. Details are not described herein.

Step S508: The first-end apparatus disables the fifth channel.

Step S509: The first-end apparatus disables a common-mode voltage and decision feedback equalizer corresponding to the fifth channel.

In this way, power consumption can be effectively reduced.

Figure 5C:
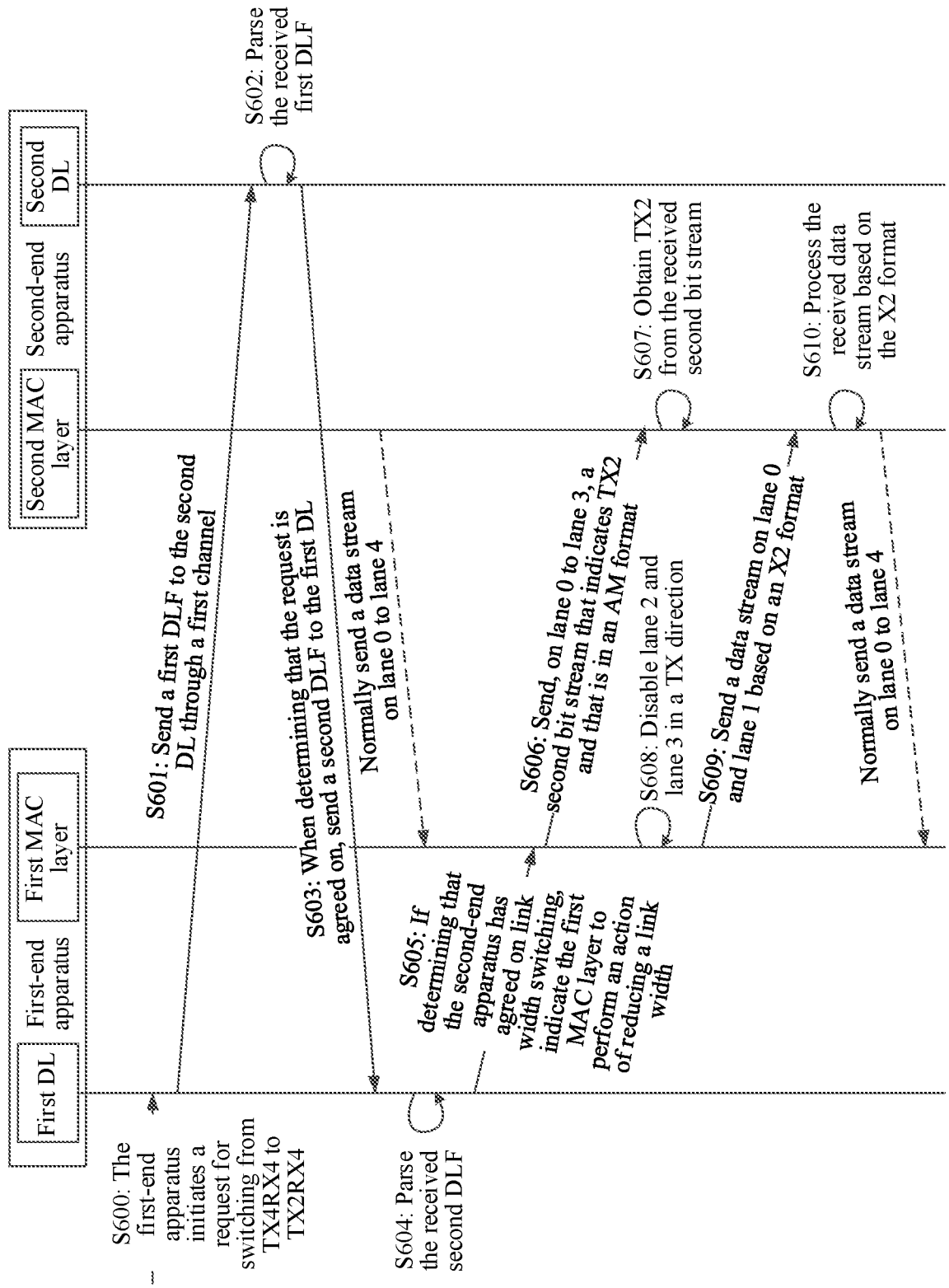
FIG. 5c is a schematic interaction diagram of reducing a link width according to an embodiment of this application.

With reference to FIG. 5c, the following describes step S501 to step S508 in FIG. 5b-1 and FIG. 5b-2 by using an example in which the first-end apparatus initiates a request for switching the first link from TX4RX4 to TX2RX4. It is assumed that before the switching, a channel, in an enabled state, of the first-end apparatus in the sending direction includes lane 0 to lane 3. In a switching process, the first-end apparatus disables lane 2 and lane 3. After the switching, a channel, in the enabled state, of the first-end apparatus in the sending direction includes lane 0 and lane 1. FIG. 5c is a schematic interaction diagram of reducing a link width according to an embodiment of this application. As shown in FIG. 5c, an interaction process includes the following steps.

Step S600: The first-end apparatus initiates the request for switching from TX4RX4 to TX2RX4.

In this step, the switching from TX4RX4 to TX2RX4 means switching the link width in the sending direction from 4 to 2, and keeping the link width in the receiving direction unchanged. That is, the link width in the sending direction needs to be reduced.

Step S601: A first DL sends a first DLF to a second DL through the first channel.

The first DLF indicates a request for adjusting the link width in the sending direction to 2. DLF.S0 (that is, the zeroth byte of a DLF packet) is set to a value 0xA0 corresponding to a link power consumption management packet, DLF.S1 (that is, the first byte of the DLF packet) is set to a value 0x1 corresponding to a link width management packet, DLF.S2.Bit0 (that is, the zeroth bit of the second byte of the DLF packet) is set to 1, and DLF.S4 (that is, the fourth byte of the DLF packet) is set to X2, so that the first DLF in this step can be obtained. The first channel refers to lane 0 to lane 3. During implementation, the first DL may send the first DLF to the second DL from any one or more channels in the first channel.

Step S602: The second DL parses the received first DLF.

Step S603: When determining that the request is agreed on, the second DL sends a second DLF to the first DL.

The second DLF indicates an agreement on that the first-end apparatus adjusts the link width in the sending direction to 2. DLF.S0 is to the value 0xA0 corresponding to the link power consumption management packet, DLF.S1 is set to the value 0x1 corresponding to the link width management packet, DLF.S3.Bit0 is set to 1, and DLF.S4 is set to X2, so that the second DLF can be obtained.

Step S604: The first-end DL parses the received second DLF.

Step S605: If determining that the second-end apparatus has agreed on the link width switching, the first DL indicates a first MAC layer to perform an action of reducing the link width.

Step S606: The first MAC layer sends, on lane 0 to lane 3, a second bit stream that indicates TX2 and that is in an AM format.

Step S607: A second MAC layer obtains TX2 from the received second bit stream.

Step S608: The first MAC layer disables lane 2 and lane 3 in the TX direction.

Step S609: The first MAC layer sends a data stream on lane 0 and lane 1 based on an X2 format.

Step S610: The second MAC layer processes the received data stream based on the X2 format.

During implementation, the processing performed by the second-end apparatus on the received data stream includes clock offset elimination processing and unpacking processing.

At this point, for the first-end apparatus, a process of switching from X4 to X2 is completed for the first link in the sending direction. As shown in FIG. 5c, in the entire switching process, a data stream sent by the second-end apparatus to the first-end apparatus is always in the X4 format, that is, the second-end apparatus normally sends the data stream to the first-end apparatus on lane 0 to lane 3, and is not affected by the foregoing switching process. In addition, for the first-end apparatus, lane 0 and lane 1 that do not participate in switching in the sending direction are always in a normal working state, and are not affected by the foregoing switching process either. Therefore, according to the link width adjustment method provided in embodiments of this application, normal data stream transmission in the entire switching process can be ensured, a problem of data stream interruption caused by channel link width switching is resolved, and reliability is improved.

At present, still refer to FIG. 5b-1 and FIG. 5b-2. When the second link width is less than the first link width, it indicates that the first-end apparatus needs to increase the link width in the sending direction. In this case, steps S510 to S516 may be performed.

Step S510: The first-end apparatus determines a second channel.

The second channel indicates a channel that is currently in a disabled state in the sending direction of the first-end apparatus and that needs to be enabled. There may be one or more second channels.

A quantity of second channels may be determined based on the first link width and the second link width. For example, when the first link width is twice the second link width, the quantity of second channels may be the same as a quantity of the first channels. When the first link width is four times the second link width, the quantity of second channels may be three times a quantity of first channels.

The first-end apparatus may determine the second channel according to a preset enabling sequence, or may determine the second channel in descending order of historical channel transmission quality, or determine the second channel in descending order of historical transmission speeds. The quantity of second channels and the determining sequence are not limited in this application.

Step S511: The first-end apparatus enables the second channel.

Step S512: The first-end apparatus enables a common-mode voltage and decision feedback equalizer corresponding to the second channel.

In this way, transmission from the first-end apparatus to the second-end apparatus can be normally performed on the second channel. In addition, in this embodiment of this application, before enabling the second channel, the first-end apparatus has completed a handshake with the second-end apparatus by using the first packet. After receiving the first packet, the second-end apparatus may cooperate with the first-end apparatus to enable the common-mode voltage and decision feedback equalizer. In this way, the second channel can work normally as soon as possible, and channel enabling time is reduced.

Step S513: The first-end apparatus sends the first bit stream on the second channel.

Step S514: The second-end apparatus determines, based on the received first bit stream, whether data communication can be performed on the second channel.

In a possible implementation, step S514 includes: The second-end apparatus detects the first bit stream when receiving the first bit stream; and if a quantity of consecutive first bit streams that succeed in the detection reaches a first quantity in a second time interval, sends, to the first-end apparatus, a third packet that carries third indication information indicating that data communication can be performed on the second channel.

When the quantity of consecutive first bit streams that succeed in the detection reaches the first quantity, the first-end apparatus sends the third packet, so that reliability can be improved. The second time interval and the first quantity may be set as required, and are not limited in this embodiment of this application.

In a possible implementation, step S514 further includes: if a quantity of consecutive first bit streams that succeed in the detection does not reach a first quantity in a second time interval, adjusting a parameter of a receiver of the second-end apparatus, and continuing to receive a first bit stream after the parameter is adjusted; and if a quantity of consecutive first bit streams that succeed in the detection reaches the first quantity in a third time interval, sending a detection success packet to the first-end apparatus.

The third time interval is set as required, and is not limited in this embodiment of this application. In an actual application process, a parameter previously stored by a receiver of a previously disabled channel may be unavailable due to a change in an ambient temperature. If the parameter of the previously disabled channel is directly loaded, a large receiving bit error rate may be caused. In this embodiment of this application, if the quantity of consecutive first bit streams that succeed in the detection does not reach the first quantity in the second time interval, parameters (for example, an FFE parameter and a CTLE parameter) of the receiver of the second-end apparatus are adjusted. In this way, a large bit error rate caused by an incorrect parameter can be avoided, and a channel enabling failure can be further avoided.

In a possible implementation, step S514 further includes: if a quantity of consecutive second bit streams that succeed in the detection within the third time interval does not reach the first quantity, sending a detection failure packet to the first-end apparatus.

In this embodiment of this application, after the second channel is enabled, the first-end apparatus continuously sends the second bit stream through the second channel, until the second-end apparatus can normally receive data through the second channel, and then the first-end apparatus transmits the data stream through the second channel. In this way, a service error caused when the second-end apparatus does not normally receive data on the second channel and the first-end apparatus has transmitted the data stream through the second channel can be avoided.

In addition, after a period of time, if the second-end apparatus still cannot normally receive data on the second channel, the second-end apparatus immediately adjusts PHY parameters (including the FFE parameter and the CTLE parameter), so that a receive equalizer of a PHY returns to a normal state.

Step S515: When determining that data communication can be performed on the second channel, the second-end apparatus sends a third packet to the first-end apparatus.

The third packet carries third indication information indicating that data communication can be performed on the second channel.

Step S516: When receiving the third packet, the first-end apparatus sends, through the first channel and the second channel, a second bit stream that carries the first link width.

Step S517: The second-end apparatus obtains the first link width from the received second bit stream, to perform de-skew processing and unpacking processing on the data stream from the first-end apparatus based on the first link width.

The second bit stream may be sent between service-related data streams, or may be carried in a service-related data stream for sending. This is not limited in this embodiment of this application.

Figure 5D:
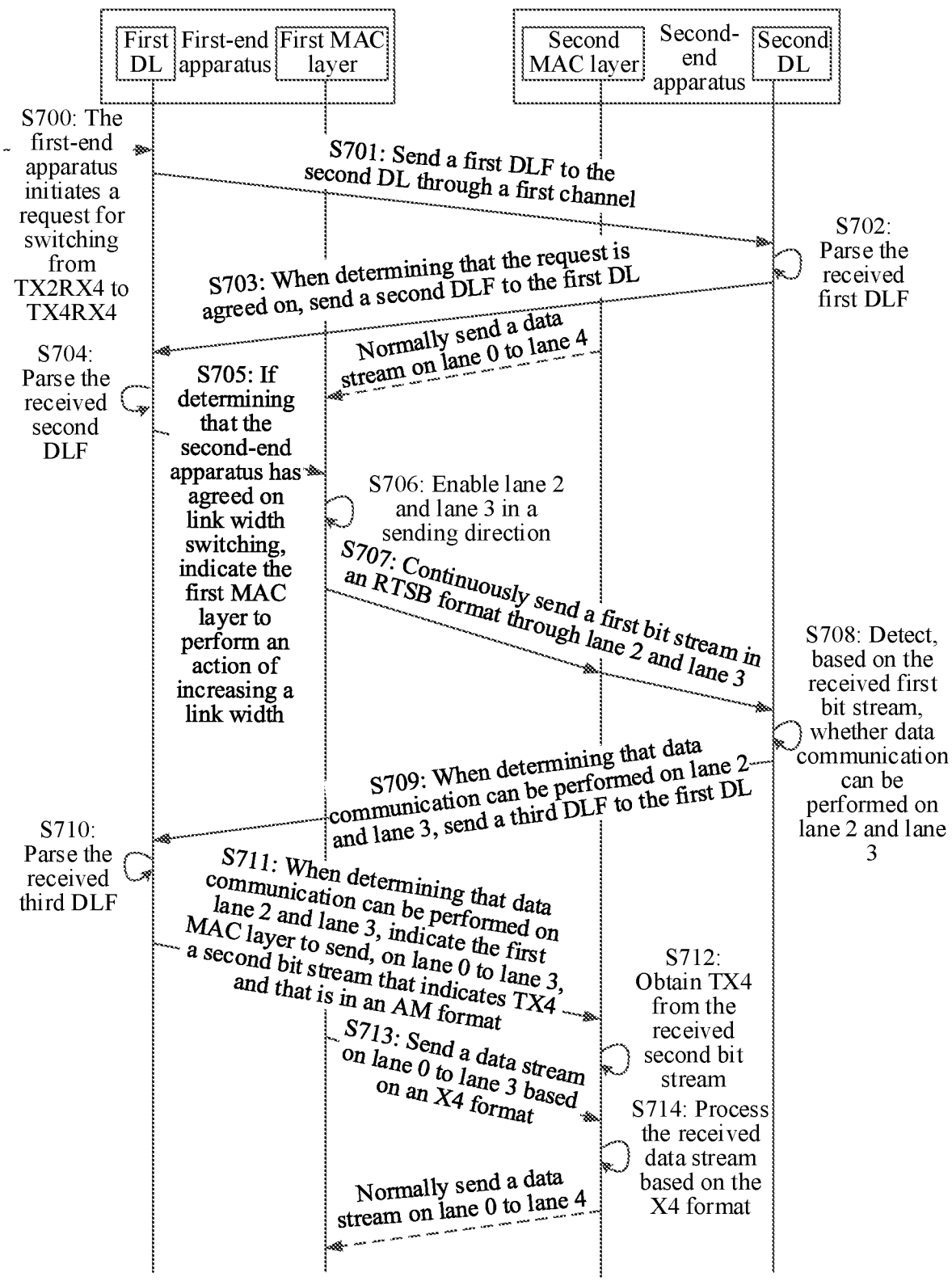
FIG. 5d is a schematic interaction diagram of increasing a link width according to an embodiment of this application.

With reference to FIG. 5d, the following describes steps S510 to S516 in FIG. 5b-1 and FIG. 5b-2 by using an example in which the first-end apparatus initiates a request for switching the first link from TX2RX4 to TX4RX4. It is assumed that before the switching, a channel, in an enabled state, of the first-end apparatus in the sending direction includes lane 0 and lane 1 (that is, the first channel). In a switching process, the first-end apparatus enables lane 2 and lane 3 (that is, the second channel). After the switching, channels, in the enabled state, of the first-end apparatus in the sending direction include lane 0 to lane 3. FIG. 5d is a schematic interaction diagram of increasing a link width according to an embodiment of this application. As shown in FIG. 5*d*, an interaction process includes the following steps.

Step S700: The first-end apparatus initiates the request for switching from TX2RX4 to TX4RX4.

In this step, the switching from TX2RX4 to TX4RX4 means switching the link width in the sending direction from 2 to 4, and keeping the link width in the receiving direction unchanged. That is, the link width in the sending direction needs to be increased.

Step S701: The first DL sends a first DLF to the second DL through the first channel.

The first DLF indicates a request for adjusting the link width in the sending direction to 4. DLF.S0 is set to a value 0xA0 corresponding to a link power consumption management packet, DLF.S1 is set to a value 0x1 corresponding to a link width management packet, DLF.S2.Bit0 is set to 1, and DLF.S4 is set to X4, so that the first DLF in this step can be obtained.

Step S702: The second DL parses the received first DLF.

Step S703: When determining that the request is agreed on, the second DL sends a second DLF to the first DL.

The second DLF indicates an agreement on that the first-end apparatus adjusts the link width in the sending direction to 4. DLF.S0 is to the value 0xA0 corresponding to the link power consumption management packet, DLF.S1 is set to the value 0x1 corresponding to the link width management packet, DLF.S3.Bit0 is set to 1, and DLF.S4 is set to X4, so that the second DLF in this step can be obtained.

In this embodiment of this application, when determining that the request is agreed on, the second-end apparatus may enable a common-mode voltage and decision feedback equalizer. In this way, the newly enabled channel can work normally as soon as possible, and channel enabling time is reduced.

Step S704: The first DL parses the received second DLF.

Step S705: If determining that the second-end apparatus has agreed on the link width switching, the first DL indicates the first MAC layer to perform an action of increasing the link width.

The action of increasing the link width performed by the first MAC layer includes the following step S706, step S707, step S710, and step S711. In this process, lane 2 and lane 3 are a newly enabled channel (that is, the second channel), and lane 0 and lane 1 are an originally enabled channel (that is, the first channel). For the channel, namely, lane 0 and lane 1, in a process in which the first MAC layer performs the action of increasing the link width, a data stream may continue to be normally sent. That is, a service on the channel, namely, lane 0 and lane 1, is not affected by an increase in the link width.

Step S706: The first MAC layer enables lane 2 and lane 3 in the sending direction.

Step S707: The first MAC continuously sends a first bit stream in an RTSB format through lane 2 and lane 3.

Step S708: The second DL detects, based on the received first bit stream, whether data communication can be performed on lane 2 and lane 3.

Step S709: When determining that data communication can be performed on lane 2 and lane 3, the second DL sends a third DLF to the first DL.

The third DLF indicates that data communication can be performed on lane 2 and lane 3. DLF.S0 is to the value 0xA0 corresponding to the link power consumption management packet, DLF.S1 is set to the value 0x1 corresponding to the link width management packet, and DLF.S3.Bit2 is set to 1, so that the third DLF in this step can be obtained.

Step S710: The first DL parses the received third DLF.

Step S711: When determining that data communication can be performed on lane 2 and lane 3, the first DL indicates the first MAC layer to send, on lane 0 to lane 3, a second bit stream that indicates TX4 and that is in an AM format.

Step S712: The second MAC layer obtains TX4 from the received second bit stream.

Step S713: The first MAC layer sends a data stream on lane 0 to lane 3 based on an X4 format.

Step S714: The second MAC layer processes the received data stream based on the X4 format.

At this point, for the first-end apparatus, switching from X2 to X4 in the sending direction is completed. As shown in FIG. 5*d*, in the entire switching process, a data stream sent by the second-end apparatus to the first-end apparatus is always in the X4 format, that is, the second-end apparatus normally sends the data stream to the first-end apparatus on lane 0 to lane 3, and is not affected by the foregoing switching process. In addition, for the first-end apparatus, lane 0 and lane 1 that do not participate in switching in the sending direction are always in a normal working state, and are not affected by the foregoing switching process either. Therefore, according to the link width adjustment method provided in embodiments of this application, normal data stream transmission in the entire switching process can be ensured, a problem of data stream interruption caused by channel link width switching is resolved, and reliability is improved.

In addition, in this embodiment of this application, the first DLF and the second DLF may be sent on a channel that does not participate in switching, for example, lane 0 and lane 1 shown in FIG. 5*c* and FIG. 5*d*, to improve reliability.

It should be noted that, based on FIG. 5*b*-1 and FIG. 5*b*-2, when a service direction is the receiving direction and the second link width is greater than the first link width, it indicates that the first-end apparatus needs to increase the link width in the receiving direction. In this case, step S505, step S506, step S508, and step S509 are performed by the second-end apparatus, and step S507 is performed by the first-end apparatus. Based on FIG. 5*b*-1 and FIG. 5*b*-2, when a service direction is the receiving direction and the second link width is less than the first link, it indicates that the first-end apparatus needs to increase the link width in the receiving direction. In this case, step S510 to step S514 and step S516 may be performed by the second-end apparatus, and step S514 and step S517 may be performed by the first-end apparatus. For a specific execution process, refer to the method shown in FIG. 5*b*-1 and FIG. 5*b*-2. Details are not described herein again.

Figure 6A:
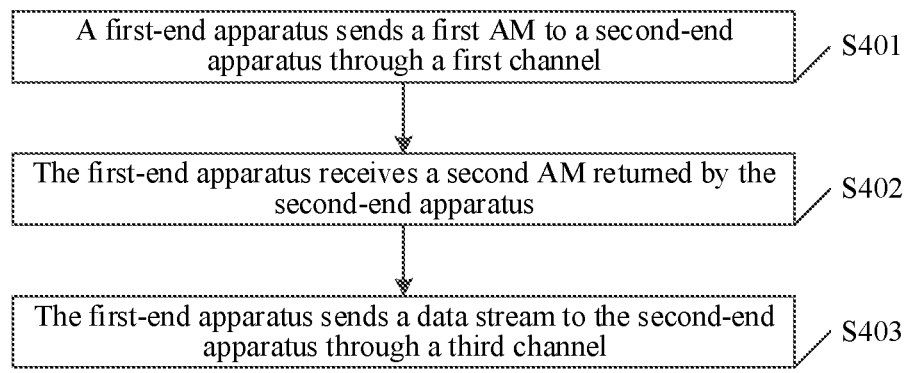
FIG. 6a is a flowchart of a link width adjustment method according to an embodiment of this application.

Considering that the first packet and the second packet provided in embodiments of this application may be packets in the AM format, when link width negotiation is performed by using the packets in the AM format, a training mode does not need to be switched to, no data stream interruption is caused, and no adverse impact is caused to a service. An embodiment of this application further provides a link width adjustment method. FIG. 6*a* is a flowchart of a link width adjustment method according to an embodiment of this application. The method may be applied to a first-end apparatus. As shown in FIG. 6*a*, the method may include the following steps.

Step S401: The first-end apparatus sends a first AM to a second-end apparatus through a first channel.

The first AM carries first indication information indicating to perform link switching. For this step, refer to step S101. Details are not described herein again. In a possible implementation, the first AM carries a first link width, and the first link width indicates a target link width.

Step S402: The first-end apparatus receives a second AM returned by the second-end apparatus.

The second AM carries second indication information indicating that the link width switching is agreed on. For this step, refer to step S102. Details are not described herein again.

Step S403: The first-end apparatus sends a data stream to the second-end apparatus through a third channel.

The third channel indicates a channel used by the first-end apparatus to send the data stream to the second-end apparatus after link width negotiation. The third channel corresponds to the first link width, and the first channel corresponds to a second link width. It may be understood that, when a channel link width is increased, the first link width is greater than the second link width, and the third channel includes the first channel and a second channel. When the channel link width is reduced, the first link width is less than the second link width, and the third channel is the foregoing fourth channel. For this step, refer to step S104. Details are not described herein again.

In this embodiment of this application, link width negotiation is implemented by using packets in an AM format, so that normal data stream transmission in an entire channel link width switching process can be ensured, a problem of data stream interruption caused by channel link width switching is resolved, and reliability is improved.

The following describes a case in which the link width is increased. The first channel corresponds to the second link width, and the first link width is greater than the second link width, indicating that the first-end apparatus needs to increase the link width. In this case, before sending the data stream to the second-end apparatus through the third channel, the first-end apparatus may further send a first bit stream to the second-end apparatus through the second channel. Then, the first-end apparatus may send the data stream to the second-end apparatus through both the first channel and the second channel, to increase the link width.

The first bit stream may be used to train the second channel for data communication, and that the first-end apparatus sends the data stream to the second-end apparatus through the third channel is actually that the first-end apparatus sends the data stream to the second-end apparatus through the first channel and the second channel.

In a possible implementation, after the first-end apparatus sends the first bit stream to the second-end apparatus through the second channel, the first-end apparatus may further receive a third AM sent by the second-end apparatus. The third AM carries third indication information indicating that data communication can be performed on the second channel. In this way, whether data communication can be performed on the second channel is detected, so that reliability of subsequent data stream transmission can be improved.

In a possible implementation, before the first-end apparatus sends the data stream to the second-end apparatus through the first channel and the second channel, the first-end apparatus may alternatively first send the second bit stream to the second-end apparatus through the first channel and the second channel, to perform link width alignment.

In a possible implementation, the data stream sent by the first-end apparatus to the second-end apparatus through the first channel and the second channel includes the second bit stream, to perform link width alignment.

The following describes a case in which the link width is reduced. The first channel corresponds to the second link width, and the first link width is less than the second link width, indicating that the first-end apparatus needs to reduce the link width. In this case, before the first-end apparatus sends the data stream to the second-end apparatus through the third channel, the third channel may be determined from the first channel. Herein, for a manner of determining the third channel, refer to a manner of determining the fourth channel. Details are not described.

In a possible implementation, before sending the data stream to the second-end apparatus through the third channel, the first-end apparatus may alternatively send the second bit stream to the second-end apparatus through the third channel, to perform link width alignment.

In a possible implementation, the data stream sent by the first-end apparatus to the second-end apparatus through the third channel may include the second bit stream, to perform link width alignment.

Figure 6B:
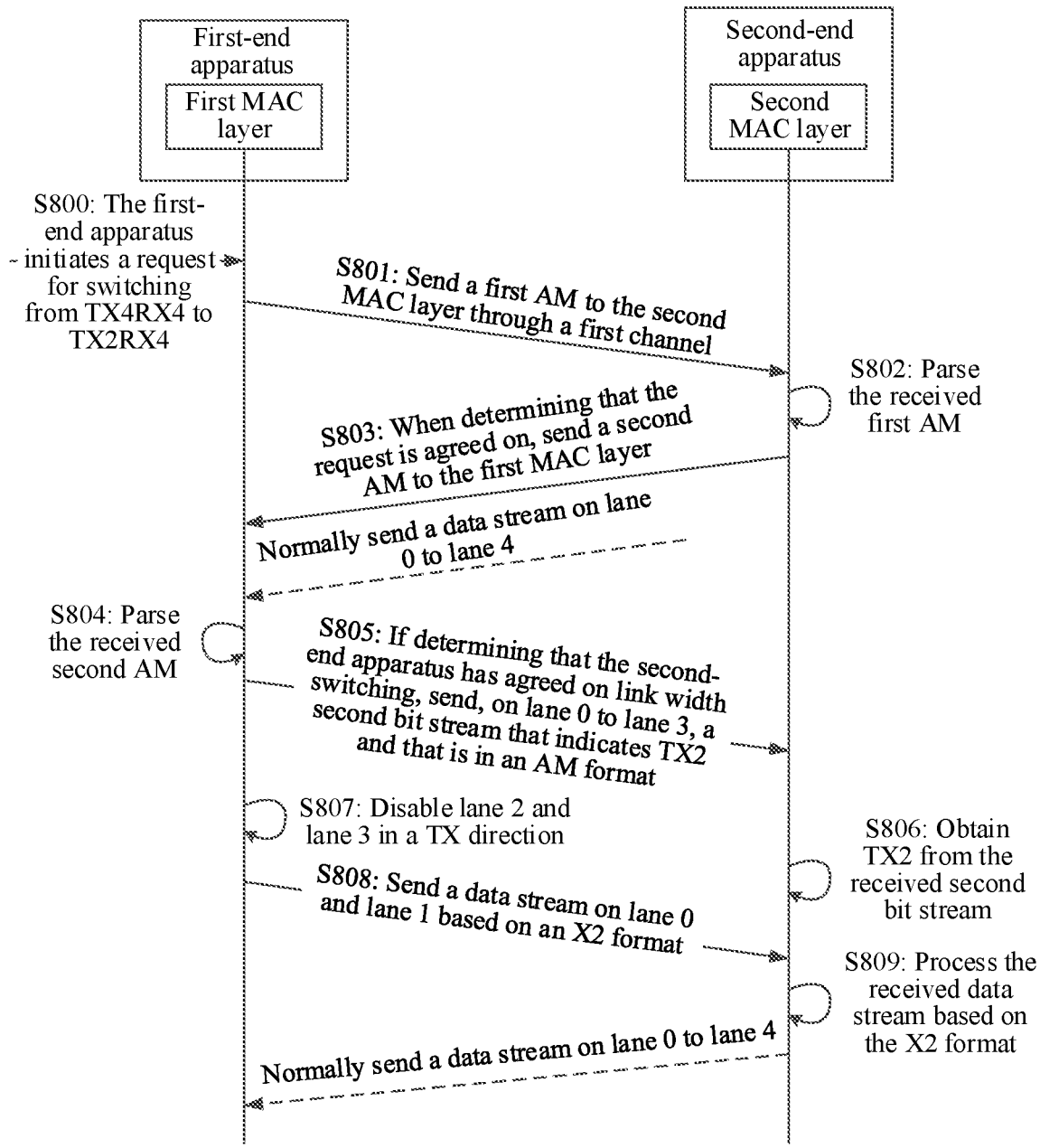
FIG. 6b is a schematic interaction diagram of reducing a link width according to an embodiment of this application.

With reference to FIG. 6b, the following describes a method for reducing the link width in FIG. 6a by using an example in which the first-end apparatus initiates a request for switching a first link from TX4RX4 to TX2RX4. It is assumed that before the switching, a channel, in an enabled state, of the first-end apparatus in a sending direction includes lane 0 to lane 3. In a switching process, the first-end apparatus disables lane 2 and lane 3. After the switching, a channel, in the enabled state, of the first-end apparatus in the sending direction includes lane 0 and lane 1. FIG. 6b is a schematic interaction diagram of reducing a link width according to an embodiment of this application. As shown in FIG. 6b, an interaction process includes the following steps.

Step S800: The first-end apparatus initiates the request for switching from TX4RX4 to TX2RX4.

In this step, the switching from TX4RX4 to TX2RX4 means switching a link width in the sending direction from 4 to 2, and keeping a link width in a receiving direction unchanged. That is, the link width in the sending direction needs to be reduced.

Step S801: A first MAC layer sends a first AM to a second MAC layer through the first channel.

The first DLF indicates a request for adjusting the link width in the sending direction to 2. AM_Payload_Type.Bit0 (that is, the zeroth bit of a type byte of an AM packet) is set to 1, and AM_Payload_Detail.Bit0 to Bit5 (that is, the zeroth bit to the fifth bit of a specific information byte of the AM packet) is set to 000010, so that the first AM in this step can be obtained. The first channel refers to lane 0 to lane 3. During implementation, the first DL may send the first AM to the second DL from any one or more channels in the first channel.

Step S802: The second MAC layer parses the received first AM.

Step S803: When determining that the request is agreed on, the second MAC layer sends a second AM to the first MAC layer.

The second AM indicates an agreement on that the first-end apparatus adjusts the link width in the sending direction to 2. AM_Payload_Type.Bit2 (that is, the second bit of the type byte of the AM packet) is set to 1, and M_Payload_Detail.Bit0 (that is, the zeroth bit of the specific information byte of the AM packet) is set to 1, so that the second AM in this step can be obtained.

Step S804: The first MAC layer parses the received second AM.

Step S805: If determining that the second-end apparatus has agreed on the link width switching, the first MAC layer sends, on lane 0 to lane 3, a second bit stream that indicates TX2 and that is in an AM format.

Step S806: The second MAC layer obtains TX2 from the received second bit stream.

Step S807: The first MAC layer disables lane 2 and lane 3 in the TX direction.

Step S808: The first MAC layer sends a data stream on lane 0 and lane 1 based on an X2 format.

Step S809: The second MAC layer processes the received data stream based on the X2 format.

During implementation, the processing performed by the second-end apparatus on the received data stream includes clock offset elimination processing and unpacking processing.

At this point, for the first-end apparatus, a process of switching from X4 to X2 in the sending direction is completed. As shown in FIG. 6b, in the entire switching process, a data stream sent by the second-end apparatus to the first-end apparatus is always in the X4 format, that is, the second-end apparatus normally sends the data stream to the first-end apparatus on lane 0 to lane 3, and is not affected by the foregoing switching process. In addition, for the first-end apparatus, lane 0 and lane 1 that do not participate in switching in the sending direction are always in a normal working state, and are not affected by the foregoing switching process either. Therefore, according to the link width adjustment method provided in embodiments of this application, normal data stream transmission in the entire switching process can be ensured, a problem of data stream interruption caused by channel switching is resolved, and reliability is improved.

Figure 6C:
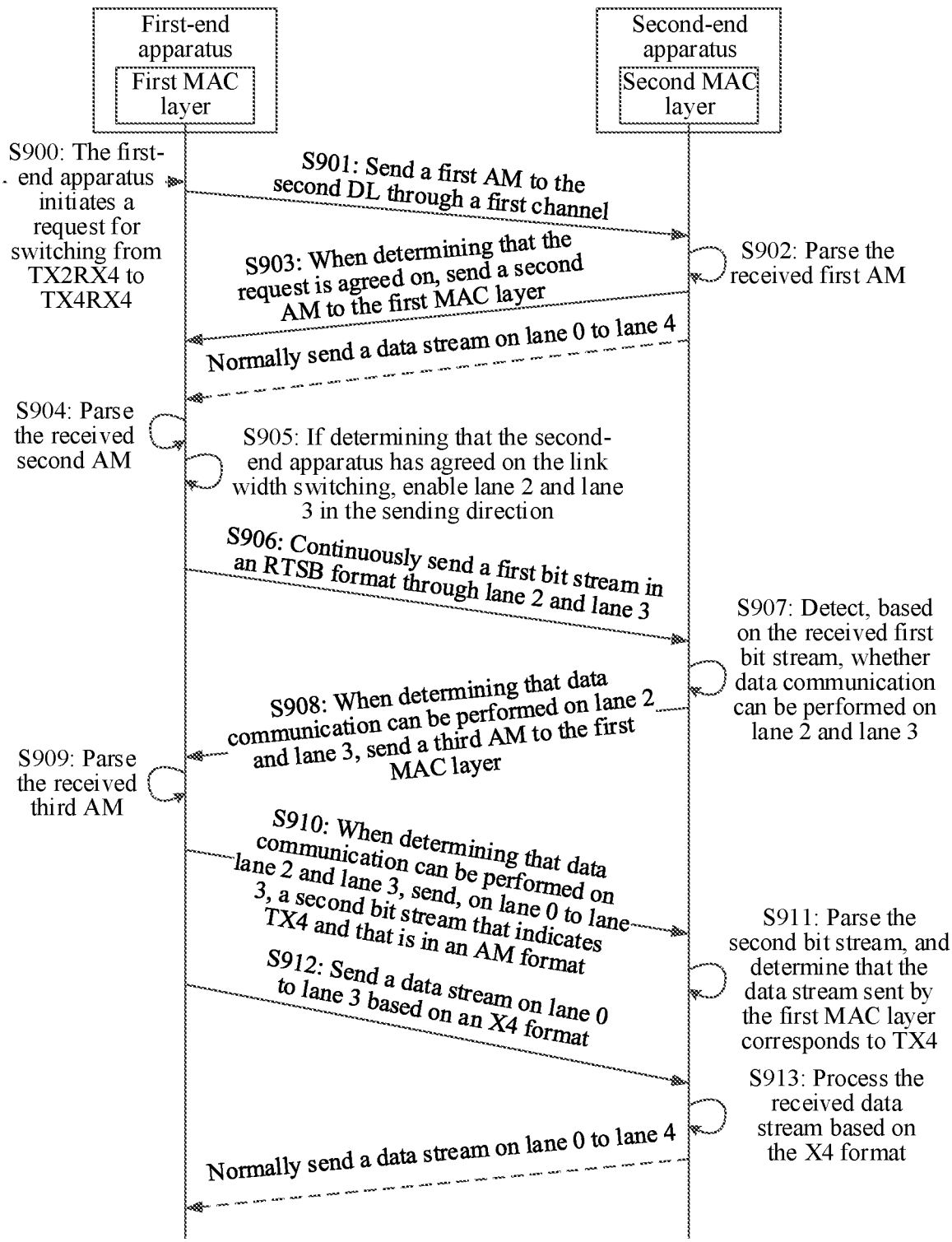
FIG. 6c is a schematic interaction diagram of increasing a link width according to an embodiment of this application.

With reference to FIG. 6c, the following describes the method for increasing the link width in FIG. 6a by using an example in which the first-end apparatus initiates a request for switching the first link from TX2RX4 to TX4RX4. It is assumed that before the switching, a channel, in an enabled state, of the first-end apparatus in the sending direction includes lane 0 and lane 1. In a switching process, the first-end apparatus enables lane 2 and lane 3. After the switching, channels, in the enabled state, of the first-end apparatus in the sending direction include lane 0 to lane 3. FIG. 6c is a schematic interaction diagram of increasing a link width according to an embodiment of this application. As shown in FIG. 6c, an interaction process includes the following steps.

Step S900: The first-end apparatus initiates the request for switching from TX2RX4 to TX4RX4.

In this step, the switching from TX2RX4 to TX4RX4 means switching the link width in the sending direction from 2 to 4, and keeping the link width in the receiving direction unchanged. That is, the link width in the sending direction needs to be increased.

Step S901: The first MAC layer sends a first AM to the second DL through the first channel.

The first AM indicates a request for adjusting the link width in the sending direction to 4. AM_Payload_Type.Bit0 (that is, the zeroth bit of a type byte of an AM packet) is set to 1, and AM_Payload_Detail.Bit0 to Bit5 (that is, the zeroth bit to the fifth bit of a specific information byte of the AM packet) is set to 000100, so that the first AM in this step can be obtained. The first channel refers to lane 0 to lane 3. During implementation, the first DL may send the first AM to the second DL from any one or more channels in the first channel.

Step S902: The second MAC layer parses the received first AM.

Step S903: When determining that the request is agreed on, the second MAC layer sends a second AM to the first MAC layer.

The second AM indicates an agreement on that the first-end apparatus adjusts the link width in the sending direction to 4. AM_Payload_Type.Bit2 (that is, the second bit of the type byte of the AM packet) is set to 1, and M_Payload_Detail.Bit0 (that is, the zeroth bit of the specific information byte of the AM packet) is set to 1, so that the second AM in this step can be obtained.

In this embodiment of this application, when determining that the request is agreed on, the second-end apparatus may enable a common-mode voltage and decision feedback equalizer. In this way, the newly enabled second channel can work normally as soon as possible, and channel enabling time is reduced.

Step S904: The first MAC layer parses the received second AM.

Step S905: If determining that the second-end apparatus has agreed on the link width switching, the first MAC layer enables lane 2 and lane 3 in the sending direction.

Step S906: The first MAC layer continuously sends a first bit stream in an RTSB format through lane 2 and lane 3.

Step S907: The second MAC layer detects, based on the received first bit stream, whether data communication can be performed on lane 2 and lane 3.

Step S908: When determining that data communication can be performed on lane 2 and lane 3, the second MAC layer sends a third AM to the first MAC layer.

The third AM indicates that data communication can be performed on lane 2 and lane 3. AM_Payload_Type.Bit4 (that is, the fourth bit of the type byte of the AM packet) is set to 1, so that the third AM in this step can be obtained.

Step S909: The first MAC layer parses the received third AM.

Step S910: When determining that data communication can be performed on lane 2 and lane 3, the first MAC layer sends, on lane 0 to lane 3, a second bit stream that indicates TX4 and that is in an AM format.

AM_Payload_Type.Bit5 (that is, the fifth bit of the type byte of the AM packet) is set to 1, so that the second bit stream in this step can be obtained.

Step S911: The second MAC layer parses the second bit stream, and determines that the data stream sent by the first MAC layer corresponds to TX4.

Step S912: The first MAC layer sends a data stream on lane 0 to lane 3 based on an X4 format.

Step S913: The second MAC layer processes the received data stream based on the X4 format.

At this point, for the first-end apparatus, the first link completes switching from X2 to X4 in the sending direction. As shown in FIG. 6c, in the entire switching process, a data stream sent by the second-end apparatus to the first-end apparatus is always in the X4 format, that is, the second-end apparatus normally sends the data stream to the first-end apparatus on lane 0 to lane 3, and is not affected by the foregoing switching process. In addition, for the first-end apparatus, lane 0 and lane 1 that do not participate in switching in the sending direction are always in a normal working state, and are not affected by the foregoing switching process either. Therefore, according to the link width adjustment method provided in embodiments of this application, normal data stream transmission in the entire switching process can be ensured, a problem of data stream interruption caused by channel switching is resolved, and reliability is improved.

In addition, in this embodiment of this application, the first AM, the second AM, and the third AM may be sent on a channel that does not participate in switching, for example, lane 0 and lane 1 shown in FIG. 6b and FIG. 6c, to improve reliability.

Figure 7:
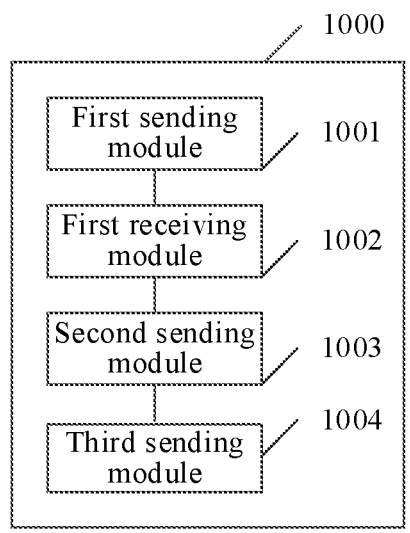
FIG. 7 is a schematic structural diagram of a link width adjustment apparatus according to an embodiment of this application.

FIG. 7 is a schematic structural diagram of a link width adjustment apparatus according to an embodiment of this application. The apparatus is used for a first-end apparatus. As shown in FIG. 7, the apparatus 1000 includes:

a first sending module 1001, configured to send a first packet to a second-end apparatus through a first channel, where the first packet carries first indication information indicating to perform link width switching;

a first receiving module 1002, configured to receive a second packet returned by the second-end apparatus, where the second packet carries second indication information indicating that the link width switching is agreed on;

a second sending module 1003, configured to send a first bit stream to the second-end apparatus through a second channel, where the first bit stream is used to train the second channel for data communication; and a third sending module 1004, configured to send a data stream to the second-end apparatus through the first channel and the second channel.

In a possible implementation, the apparatus further includes:

a fourth sending module, configured to send a second bit stream to the second-end apparatus through the first channel and the second channel, where the second bit stream indicates a link width for sending the data stream.

In a possible implementation, the data stream includes a second bit stream, and the second bit stream indicates a link width for sending the data stream.

In a possible implementation, the apparatus further includes:

a second receiving module, configured to receive a third packet sent by the second-end apparatus, where the third packet carries third indication information indicating that data communication can be performed on the second channel.

In a possible implementation, the first-end apparatus includes a first data link layer DL, and the second-end apparatus includes a second DL; and the first sending module is further configured to:

send a first data link flit DLF to the second DL through the first DL and the first channel, where the first DLF carries the first indication information, the first indication information includes a first identifier and a first link width, the first identifier indicates that the first DLF is a request packet for adjusting a link width in a sending direction, and the first link width indicates a target link width.

In a possible implementation, the first receiving module is further configured to:

receive, through the first DL, a second DLF sent through the second DL, where the second DLF includes the second indication information, the second indication information includes a second identifier and the first link width, and the second identifier indicates that the second DLF is a response indicating an agreement on the request for adjusting the link width in the sending direction.

In a possible implementation, the first-end apparatus further includes a first media access control MAC layer, and the apparatus further includes:

a fifth sending module, configured to send a first indication to the first MAC layer through the first DL, to cause the first MAC layer to enable the second channel.

In a possible implementation, the second-end apparatus further includes a second MAC layer, and the second sending module is further configured to:

send the first bit stream to the second MAC layer through the first MAC layer and the second channel.

In a possible implementation, the first end apparatus includes a first DL, and the second-end apparatus includes a second DL; and the second receiving module is further configured to:

receive, through the first DL, a third DLF sent through the second DL, where the third DLF includes the third indication information, the third indication information includes a third identifier, and the third identifier indicates that data communication can be performed on the second channel.

In a possible implementation, the first-end apparatus further includes a first MAC layer, and the second-end apparatus further includes a second MAC layer; and the third sending module is further configured to:

send a second indication to the first MAC layer through the first DL, to cause the first MAC to send the data stream to the second MAC layer through the first channel and the second channel.

In a possible implementation, the first packet carries the first link width, and the first link width indicates the target link width.

Figure 8:
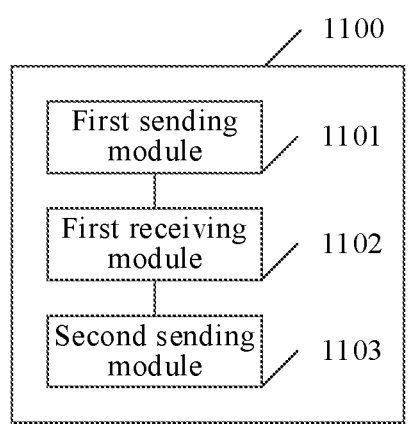
FIG. 8 is a schematic structural diagram of a link width adjustment apparatus according to an embodiment of this application.

FIG. 8 is a schematic structural diagram of a link width adjustment apparatus according to an embodiment of this application. The apparatus is used for a first-end apparatus. As shown in FIG. 8, the apparatus 1100 includes:

a first sending module 1101, configured to send a first alignment marker AM to a second-end apparatus through a first channel, where the first AM carries first indication information indicating to perform link switching;

a first receiving module 1102, configured to receive a second AM returned by the second-end apparatus, where the second AM carries second indication information indicating that the link width switching is agreed on; and a second sending module 1103, configured to send a data stream to the second-end apparatus through a third channel, where the third channel corresponds to a first link width.

In a possible implementation, the first channel corresponds to a second link width, and the first link width is greater than the second link width; and the apparatus further includes:

a third sending module, configured to send a first bit stream to the second-end apparatus through a second channel, where the first bit stream is used to train the second channel for data communication; and the second sending module is further configured to:

send the data stream to the second-end apparatus through the first channel and the second channel.

In a possible implementation, the apparatus further includes:

a fourth sending module, configured to send a second bit stream to the second-end apparatus through the first channel and the second channel, where the second bit stream indicates the first link width.

In a possible implementation, the apparatus further includes:

a second receiving module, configured to receive a third AM sent by the second-end apparatus, where the third AM carries third indication information indicating that data communication can be performed on the second channel.

In a possible implementation, the data stream includes a second bit stream, and the second bit stream indicates the first link width.

In a possible implementation, the first channel corresponds to a second link width, and the first link width is less than the second link width; and the apparatus further includes:

a determining module, configured to determine the third channel from the first channel.

In a possible implementation, the apparatus further includes:

a fifth sending module, configured to send a second bit stream to the second-end apparatus through the third channel, where the second bit stream indicates the first link width.

In a possible implementation, the data stream includes a second bit stream, and the second bit stream indicates the first link width.

In a possible implementation, the first AM carries the first link width.

An embodiment of this application provides a serial port, including a processor, and a memory configured to store instructions executable by the processor. The processor is configured to implement the foregoing method when executing the instructions.

An embodiment of this application provides a non-volatile computer-readable storage medium, storing computer program instructions. When the computer program instructions are executed by a processor, the foregoing method is implemented.

An embodiment of this application provides a computer program product, including computer-readable code or a non-volatile computer-readable storage medium carrying computer-readable code. When the computer-readable code is run in a processor of an electronic device, the processor in the electronic device performs the foregoing method.

The computer-readable storage medium may be a tangible device that may retain and store instructions for use by an instruction execution device. The computer-readable storage medium may be, for example, (but is not limited to) an electrical storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random access memory (Random Access Memory, RAM), a read-only memory (Read Only Memory, ROM), an erasable programmable read-only memory (Electrically Programmable Read-Only-Memory, EPROM, or flash memory), a static random access memory (Static Random Access Memory, SRAM), a portable compact disc read-only memory (Compact Disc Read-Only Memory, CD-ROM), a digital versatile disc (Digital Video Disc, DVD), a memory stick, a floppy disk, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this application may be assembly instructions, instruction set architecture (Instruction Set Architecture, ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (Local Area Network, LAN) or a wide area network (Wide Area Network, WAN), or may be connected to an external computer (for example, connected by using an Internet service provider over the Internet). In some embodiments, an electronic circuit, for example, a programmable logic circuit, a field programmable gate array (Field Programmable Gate Array, FPGA), or a programmable logic array (Programmable Logic Array, PLA), is customized by using status information of computer-readable program instructions. The electronic circuit may execute the computer-readable program instructions, to implement various aspects of this application.

The various aspects of this application are described herein with reference to the flowcharts and/or the block diagrams of the method, the apparatus (system), and the computer program product according to embodiments of this application. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or the another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this application. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an ASIC (Application-Specific Integrated Circuit, application-specific integrated circuit)) that performs a corresponding function or action, or may be implemented by a combination of hardware and software, for example, firmware.

Although the present application is described with reference to embodiments, in a process of implementing the present application that claims protection, a person skilled in the art may understand and implement another variation of the disclosed embodiments by viewing the accompanying drawings, the disclosed content, and the accompanying claims. In the claims, the word "comprise" (comprising) does not exclude another component or step, and "a" or "one" does not exclude a case of plurality. A single processor or another unit may implement several functions enumerated in the claims. Some measures are recorded in dependent claims that are different from each other, but this does not mean that these measures cannot be combined to produce a better effect.

Embodiments of this application are described above. The foregoing descriptions are examples, are not exhaustive, and are not limited to the disclosed embodiments. Many modifications and changes are clear to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A link width adjustment method, comprising:
    sending a first packet to a second-end apparatus through a first data link layer (DL) of a first-end apparatus and a first channel, wherein the first packet comprises a first data link flit (DLF) that carries first indication information indicating to perform link width switching, wherein the first indication information comprises a first identifier and a first link width, the first identifier indicates that the first DLF is a request packet for adjusting a link width in a sending direction, and the first link width indicates a target link width;
    receiving a second packet returned by the second-end apparatus, wherein the second packet carries second indication information indicating that the link width switching is agreed on;
    sending a first bit stream to the second-end apparatus through a second channel, wherein the first bit stream is used to train the second channel for a data communication; and
    sending a data stream to the second-end apparatus through the first channel and the second channel.

2. The method according to claim 1, wherein before the sending a data stream to the second-end apparatus through the first channel and the second channel, the method further comprises:
    sending a second bit stream to the second-end apparatus through the first channel and the second channel, wherein the second bit stream indicates a link width for sending the data stream.

3. The method according to claim 1, wherein the data stream comprises a second bit stream, and the second bit stream indicates a link width for sending the data stream.

4. The method according to claim 1, wherein after the sending a first bit stream to the second-end apparatus through a second channel, the method further comprises:
    receiving a third packet sent by the second-end apparatus, wherein the third packet carries third indication information indicating that data communication can be performed on the second channel.

5. The method according to claim 1, wherein the receiving a second packet returned by the second-end apparatus comprises:
    receiving, through the first DL, a second DLF sent through the second DL, wherein the second DLF comprises the second indication information, the second indication information comprises a second identifier and the first link width, and the second identifier indicates that the second DLF is a response indicating an agreement on the request for adjusting the link width in the sending direction.

6. The method according to claim 5, wherein the first-end apparatus further comprises a first media access control (MAC) layer, and after the receiving a second DLF through the first DL, the method further comprises:
    sending a first indication to the first MAC layer through the first DL, to cause the first MAC layer to enable the second channel.

7. The method according to claim 6, wherein the second-end apparatus further comprises a second MAC layer, and the sending a first bit stream to the second-end apparatus through a second channel comprises:
    sending the first bit stream to the second MAC layer through the first MAC layer and the second channel.

8. The method according to claim 4, wherein the first-end apparatus comprises a first DL, and the second-end apparatus comprises a second DL; and the receiving a third packet sent by the second-end apparatus comprises:
    receive, through the first DL, a third DLF sent through the second DL, wherein the third DLF comprises the third indication information, the third indication information comprises a third identifier, and the third identifier indicates that data communication can be performed on the second channel.

9. A first-end apparatus, comprising at least one memory and at least one processor, wherein the at least one memory stores a computer program for execution by the at least one processor to cause the first-end apparatus to perform the following operations:
  sending a first packet to a second-end apparatus through a first data link layer (DL) of a first-end apparatus and a first channel, wherein the first packet comprises a first data link flit (DLF) that carries first indication information indicating to perform link width switching, wherein the first indication information comprises a first identifier and a first link width, the first identifier indicates that the first DLF is a request packet for adjusting a link width in a sending direction, and the first link width indicates a target link width;
  receiving a second packet returned by the second-end apparatus, wherein the second packet carries second indication information indicating that the link width switching is agreed on;
  sending a first bit stream to the second-end apparatus through a second channel, wherein the first bit stream is used to train the second channel for a data communication; and
  sending a data stream to the second-end apparatus through the first channel and the second channel.

10. The first-end apparatus according to claim 9, wherein before the sending a data stream to the second-end apparatus through the first channel and the second channel, the operations further comprise:
  sending a second bit stream to the second-end apparatus through the first channel and the second channel, wherein the second bit stream indicates a link width for sending the data stream.

11. The first-end apparatus according to claim 9, wherein the data stream comprises a second bit stream, and the second bit stream indicates a link width for sending the data stream.

12. The first-end apparatus according to claim 9, wherein after the sending a first bit stream to the second-end apparatus through a second channel, the operations further comprise:
  receiving a third packet sent by the second-end apparatus, wherein the third packet carries third indication information indicating that data communication can be performed on the second channel.

13. The first-end apparatus according to claim 9, wherein the receiving a second packet returned by the second-end apparatus comprises:
  receiving, through the first DL, a second DLF sent through the second DL, wherein the second DLF comprises the second indication information, the second indication information comprises a second identifier and the first link width, and the second identifier indicates that the second DLF is a response indicating an agreement on the request for adjusting the link width in the sending direction.

14. The first-end apparatus according to claim 13, wherein the first-end apparatus further comprises a first media access control (MAC) layer, and after the receiving a second DLF through the first DL, the operations further comprise:
  sending a first indication to the first MAC layer through the first DL, to cause the first MAC layer to enable the second channel.

15. The first-end apparatus according to claim 14, wherein the second-end apparatus further comprises a second MAC layer, and the sending a first bit stream to the second-end apparatus through a second channel comprises:
  sending the first bit stream to the second MAC layer through the first MAC layer and the second channel.

16. The first-end apparatus according to claim 12, wherein the first-end apparatus comprises a first DL, and the second-end apparatus comprises a second DL; and the receiving a third packet sent by the second-end apparatus comprises:
  receive, through the first DL, a third DLF sent through the second DL, wherein the third DLF comprises the third indication information, the third indication information comprises a third identifier, and the third identifier indicates that data communication can be performed on the second channel.

17. The first-end apparatus according to claim 9, wherein the apparatus is a serial port.

18. A non-volatile computer-readable storage medium, storing computer program instructions, that when executed by at least one processor, cause a computer to perform operations comprising:
  sending a first packet to a second-end apparatus through a first data link layer (DL) and a first channel, wherein the first packet comprises a first data link flit (DLE) that carries first indication information indicating to perform link width switching, wherein the first indication information comprises a first identifier and a first link width, the first identifier indicates that the first DLF is a request packet for adjusting a link width in a sending direction, and the first link width indicates a target link width;
  receiving a second packet returned by the second-end apparatus, wherein the second packet carries second indication information indicating that the link width switching is agreed on;
  sending a first bit stream to the second-end apparatus through a second channel, wherein the first bit stream is used to train the second channel for a data communication; and
  sending a data stream to the second-end apparatus through the first channel and the second channel.

* * * * *